(12) United States Patent
Aronowitz

(10) Patent No.: US 12,055,479 B2
(45) Date of Patent: Aug. 6, 2024

(54) TRICORDER REFLECTOMETER FOR LATERAL FLOW IMMUNOLOGICAL TESTS

(71) Applicant: Mireya C. Aronowitz, Delray Beach, FL (US)

(72) Inventor: Jack L. Aronowitz, Delray Beach, FL (US)

(73) Assignee: Mireya C. Aronowitz, Delray Beach, FL (US)

( * ) Notice: Subject to any disclaimer, the term of this patent is extended or adjusted under 35 U.S.C. 154(b) by 0 days.

(21) Appl. No.: 17/446,082

(22) Filed: Aug. 26, 2021

(65) Prior Publication Data

US 2022/0065775 A1    Mar. 3, 2022

Related U.S. Application Data

(60) Provisional application No. 63/071,464, filed on Aug. 28, 2020.

(51) Int. Cl.
| | | |
|---|---|---|
| *G01N 21/25* | (2006.01) | |
| *G01N 21/27* | (2006.01) | |
| *G01N 21/47* | (2006.01) | |
| *G01N 21/84* | (2006.01) | |

(52) U.S. Cl.
CPC ......... *G01N 21/255* (2013.01); *G01N 21/274* (2013.01); *G01N 21/4738* (2013.01); *G01N 21/8483* (2013.01)

(58) Field of Classification Search
None
See application file for complete search history.

(56) References Cited

U.S. PATENT DOCUMENTS 6,285,454 B1 * 9/2001 Douglas ............. G01N 21/8483
356/246
6,394,952 B1 * 5/2002 Anderson .......... G01N 33/6887
436/814

(Continued)

FOREIGN PATENT DOCUMENTS

KR    10-2010-0073061        7/2010
WO    WO-2016155438 A1 * 10/2016 ............. G01N 21/75

OTHER PUBLICATIONS

International Search Report and Written Opinion, PCT International Application No. PCT/US2021/047744, PCT/ISA/210, PCT/ISA/220, and PCT/ISA/237, mail date Dec. 1, 2021.

*Primary Examiner* — Dominic J Bologna
*Assistant Examiner* — Roberto Fabian, Jr.
(74) *Attorney, Agent, or Firm* — Saliwanchik, Lloyd & Eisenschenk

(57) ABSTRACT

A reflectometer and method of use for measuring an amount of analyte in a sample are provided. The reflectometer can include a plurality of reading heads for obtaining reflectance information from discrete regions on a lateral flow test strip. The reflectance information is processed to obtain a digital value for the reflectance. The discrete regions can include a test zone and at least two control zones that each has a differing amount of detection moiety binding substance. The digital values for each control zone can be employed to establish a high end standard and a low end standard. The digital value for the test zone interpolated to the standards to obtain an accurate quantitative value for the analyte in the sample.

20 Claims, 15 Drawing Sheets

(56) References Cited

U.S. PATENT DOCUMENTS

| | | | |
|---|---|---|---|
| 6,574,425 B1* | 6/2003 | Weiss | G01N 21/274 356/402 |
| 7,315,378 B2* | 1/2008 | Phelan | G01N 21/8483 356/436 |
| 8,797,536 B2* | 8/2014 | Lee | G01N 21/78 356/436 |
| 10,088,412 B2 | 10/2018 | Lee et al. | |
| 2003/0214655 A1* | 11/2003 | Weiss | G01N 21/8483 356/402 |
| 2004/0115832 A1* | 6/2004 | Shareef | B01L 3/5023 436/514 |
| 2005/0157304 A1* | 7/2005 | Xiao | G01N 21/552 356/446 |
| 2006/0109475 A1* | 5/2006 | Misener | G01N 21/8483 356/446 |
| 2009/0155921 A1* | 6/2009 | Lu | G01N 21/8483 436/164 |
| 2009/0303477 A1* | 12/2009 | Burd | G01J 3/02 356/326 |
| 2010/0157300 A1* | 6/2010 | Lee | G01N 21/8483 356/402 |
| 2011/0200999 A1* | 8/2011 | Soni | C12Q 1/6804 435/287.2 |
| 2012/0179383 A1* | 7/2012 | Yeo | G01N 21/278 73/1.01 |
| 2018/0321251 A1* | 11/2018 | Beckley | G01N 33/558 |
| 2020/0209158 A1 | 7/2020 | Nikolaenko et al. | |

\* cited by examiner

TRICORDER REFLECTOMETER FOR LATERAL FLOW IMMUNOLOGICAL TESTS

CROSS-REFERENCE TO RELATED APPLICATION

This application claims the benefit of U.S. Provisional Application Ser. No. 63/071,464, filed Aug. 28, 2020, which is hereby incorporated by reference herein in its entirety, including any figures, tables, and drawings.

BACKGROUND

Lateral flow immunochemistry tests are well-known for detecting the presence or absence of an analyte in a sample of blood, urine, or other bodily fluid. Such tests typically utilize a test strip on which an analyte-binding zone and detection moiety-binding zone are fixed or stabilized. The bodily fluid sample can be treated in advance or on the test strip with a detection moiety or analyte-label that binds to the analyte. This creates a conjugated-analyte that can provide a visual or otherwise detectable signal indicating that the analyte was present in the bodily fluid sample. When the bodily fluid sample is placed on the test strip, it migrates through the test strip until it reaches a control zone and the analyte-binding zone. The conjugated-analyte, with the detection moiety attached thereto, will become bound to the analyte-binding zone, thereby capturing the analyte and the attached detection moiety, which can indicate that the analyte was present in the bodily fluid. Excess detection moiety that is not bound to the analyte in the sample will bind only to the control zone to provide an indication that the test strip was functional. In some cases, the darkness or intensity of the conjugated-analyte bound to the analyte-binding zone can provide a rudimentary qualitative indication of the analyte concentration in the bodily fluid sample. In other cases, the control zone can comprise a known-concentration of detection moiety-binding substance and can be used to compare with the conjugated-analyte bound to the test zone.

Recent developments have provided lateral flow immunochemistry tests that utilize two control zones in which different concentrations of detection moiety-binding substance is fixed or stabilized. During the test different amounts of the detection moiety are bound or captured in each control zone. There are several detection moieties known in the art, with colloidal gold being the most commonly used. Detection moieties that employ reflected light as measure of concentration bound to each zone creates color and/or intensity that can be detected and measured with a reflectometer. By comparing the reflectance and/or color of each control zone to a predetermined extrapolation curve, a unique high end standard and a unique low end standard can be established for the particular test strip. The amount of conjugated-analyte bound to the test zone can then be determined by comparing the reflectance measurement to the high and low standards calculated for the test strip or for a manufacturing "lot" of test strips. The accuracy of this test can depend on the ability of the reflectometer to accurately detect the amount of reflectance from the detection moiety bound to the control zones and the conjugated-analyte binding zone. U.S. Pat. No. 6,574,425 describes a reflectometer that utilizes a feedback mechanism and temperature to calibrate for external factors that adversely affect the measurement of reflectance from the detection moiety bound to a test strip.

BRIEF SUMMARY

There is a need for a reflectometer capable of more accurately measuring the reflectance from a test strip. It would be beneficial for the reflectometer to utilize multiple control zones that can establish standards to facilitate interpolation of the test results. Ideally, the reflectometer can compensate for the same extraneous factors in the control and test zones, as well as variations that may exist between tests and test strips.

In accordance with embodiments of the subject invention, the problem of accurately measuring an amount of detection-moiety bound to discrete areas on a test strip is solved by embodiments of a reflectometer comprising a dedicated reading head for each discrete area on a test strip. A reading head can include a light source directed at the discrete area. Light is reflected from the discrete area at a wavelength that produces a color that can be captured, analyzed, and compared to programmed information in the reflectometer to provide an accurate measure of the amount of analyte present in a sample of bodily fluid. Advantageously, the reflectometer can be calibrated for use with a specific test strip or manufactured "lot" of test strips, which can inhibit the effects of variation between test strips on results.

The reflectometer can be particularly advantageous with test strips configured with two or more discrete areas that are control zones, where each has a different amount of detection-moiety binding substance. After a test is conducted, the reflectometer can measure the known and differing amount of a detection-moiety bound to the two or more control zones. The reflectometer can also measure the amount of conjugated-analyte bound to the discrete area that is a test zone. Each control zone can have a dedicated reading head for independently emitting light and receiving reflected light from the control zone. The test zone can also have a dedicated reading head for emitting light and receiving reflected light from the test zone. Each reading head can transmit the respective reflectance information to a microprocessor. Additionally, background reflectance from the test strip can be measured and transmitted to the microprocessor. Temperature can also be measured and used to compensate for any effects on the reflectance readings.

The microprocessor can be programmed with an algorithm that utilizes a model extrapolation or "standard" curve against which the reflectance measurements from the two or more control zones can be fit. The background reflectance can also be subtracted from each reflectance measurement from the discrete zones to provide a more accurate measurement of the detection-moiety bound to each discrete zone. The reflectance measurement from the test zone can subsequently be interpolated with respect to the fitted curve to determine a value of the reflectance from the test zone. The microprocessor could also be programmed with one or more look-up tables (LOTs) against which the test zone reflectance value can be compared to determine an accurate amount of analyte in the sample. This process can eliminate the necessity of trying to compensate or calibrate for extraneous factors by assuming that each discrete area will be similarly affected and subsequently compensated for by fitting to the extrapolation curve.

In an embodiment, a reflectometer can comprise: a case; a first reading head comprising first scanning optics configured to illuminate a first control zone of a test strip and receive first light from the first control zone; a second reading head comprising second scanning optics configured to illuminate a test zone of the test strip and receive second light from the test zone; a third reading head comprising third scanning optics configured to illuminate a second control zone of the test strip and receive third light from the second control zone; and a microprocessor in operable communication with the first reading head, the second reading head, and the third reading head. The microprocessor can be configured to: receive and analyze a first analog signal, a second analog signal, and a third analog signal corresponding to the first light, the second light, and the third light, respectively; and determine a first level of an analyte in the first control zone based on the first light, a second level of the analyte in the test zone based on the second light, a third level of the analyte in the second control zone based on the third light, and an overall level of the analyte in the test solution based on the first level, the second level, and the third level.

In another embodiment, a kit for measuring an overall level of an analyte in a test solution can comprise: a test strip as described herein; a cassette as described herein and configured to receive the test strip; and a reflectometer as described herein.

In another embodiment, a method for measuring an overall level of an analyte in a test solution can comprise: providing a kit or a reflectometer as described herein; providing the test strip to the reflectometer; and providing the test solution to the test strip to receive from the reflectometer the overall level of the analyte in the test solution

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which.

DETAILED DISCLOSURE

Figure 1:
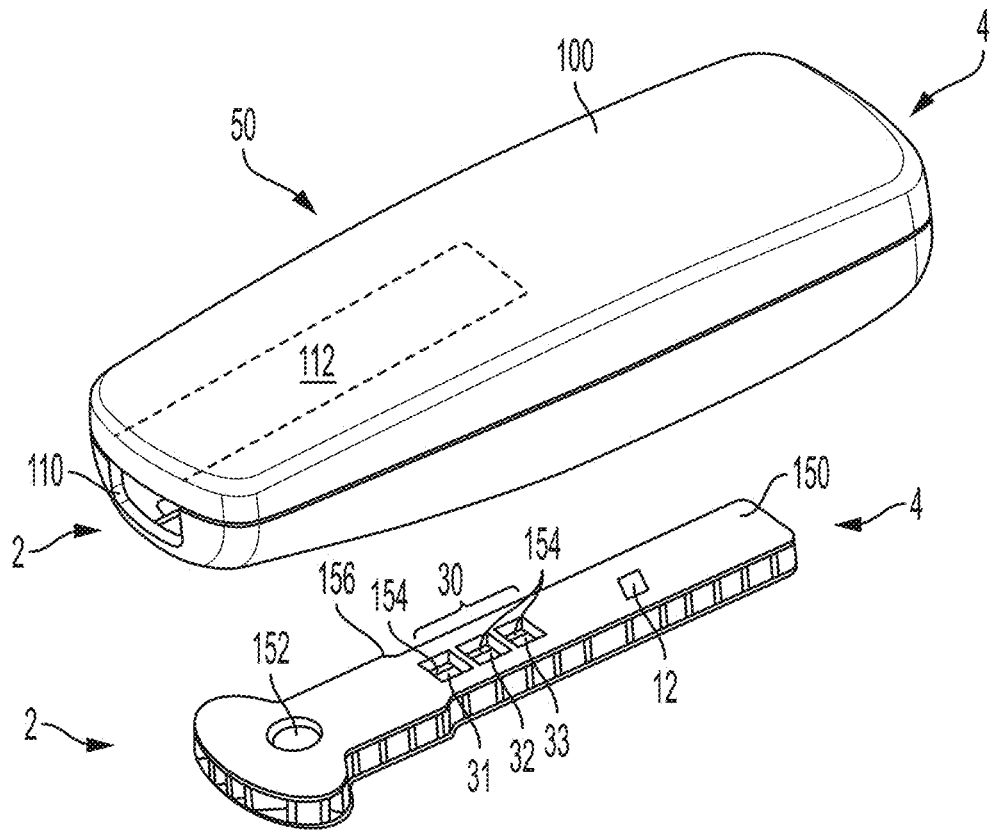
FIG. 1 illustrates one embodiment of a reflectometer having a case and a cassette in which a lateral flow test strip is secured for insertion into the case.

Embodiments of the subject invention provide methods and devices for measuring an analyte in a sample of bodily fluid. More specifically, embodiments provide reflectometers, or similar devices, for detecting and analyzing an amount of detection moiety bound to discrete areas on a lateral flow test strip. Embodiments of the subject invention can be used to accurately measure the amount of analyte in a sample by measuring the amount of that analyte conjugated to the detection moiety and bound to a test zone and comparing that result with the amount of detection moiety bound to two or more control zones. The reflectometer can be programmed to extrapolate or "fit" the results obtained from the two or more control zones with regard to an extrapolation curve, so that the measurement obtained from the test zone can be interpolated to obtain a digital value that can be used in a lookup-table (LOT) or an algorithm to accurately quantify the analyte concentration in the sample.

Recent developments have provided lateral flow immunochemistry tests that utilize two control zones in which different concentrations of detection moiety-binding substance is fixed or stabilized. During the test different amounts of the detection moiety are bound or captured in each control zone. There are several detection moieties known in the art, with colloidal gold being the most commonly used. Detection moieties that employ reflected light as measure of concentration bound to each zone creates color and/or intensity that can be detected and measured with a reflectometer. By comparing the reflectance and/or color of each control zone to a predetermined extrapolation curve, a unique high end standard and a unique low end standard can be established for the particular test strip. The amount of conjugated-analyte bound to the test zone can then be determined by comparing the reflectance measurement to the high and low standards calculated for the test strip or for a manufacturing "lot" of test strips. The accuracy of this test can depend on the ability of the reflectometer to accurately detect the amount of reflectance from the detection moiety bound to the control zones and the conjugated-analyte binding zone. U.S. Pat. No. 6,574,425 describes a reflectometer that utilizes a feedback mechanism and temperature to calibrate for external factors that adversely affect the measurement of reflectance from the detection moiety bound to a test strip.

There is a need for a reflectometer capable of more accurately measuring the reflectance from a test strip. It would be beneficial for the reflectometer to utilize multiple control zones that can establish standards to facilitate interpolation of the test results. Ideally, the reflectometer can compensate for the same extraneous factors in the control and test zones, as well as variations that may exist between tests and test strips.

The following description will disclose that embodiments of the subject invention are particularly useful in the field of lateral flow immunology tests utilizing a conjugated-analyte with a detection moiety capable of reflecting light. While the subject application describes, and many of the terms herein relate to, a use for measuring reflected light from a discrete area on a lateral flow test strip, other modifications apparent to a person with skill in the art and having benefit of the subject disclosure are contemplated to be within the scope of the present invention.

In the description that follows, a number of terms are utilized. In order to provide a clear and consistent understanding of the specification and claims, including the scope to be given such terms, the following definitions are provided.

Initially, it should be understood that the use of "and/or" is inclusive, such that the term "A and/or B" should be read to include the sets: "A and B," "A or B," "A," and "B."

When the term "approximately" or "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05.

As used herein, terms indicating relative direction or orientation, including but not limited to "upper", "lower", "top", "bottom", "vertical", "horizontal", "outer", "inner", "front", "back", and the like, are intended to facilitate description of embodiments of the present invention by indicating relative orientation or direction according to their usual use and understanding, and are not intended to limit the scope of embodiments of the present invention in any way to such orientations or directions.

Also, as used herein, and unless otherwise specifically stated, the terms "operable communication," "operable connection," "operably connected," "cooperatively engaged" and grammatical variations thereof mean that the particular elements are connected in such a way that they cooperate to achieve their intended function or functions. The "connection" or "engagement" may be direct, or indirect, physical or remote.

In addition, reference is made throughout the application to the "proximal end" and "distal end." As used herein, the proximal end is that end nearest to that end of the case in which a lateral flow test strip is received or inserted. Conversely, the distal end of the device is that end furthest from where the lateral flow test strip is received or inserted.

It is to be understood that the figures and descriptions of embodiments of the present invention have been simplified to illustrate elements that are relevant for a clear understanding of the invention, while eliminating, for purposes of clarity, other elements that may be well known. Those of ordinary skill in the art will recognize that other elements may be desirable and/or required in order to implement the present invention. However, because such elements are well known in the art, and because they do not facilitate a better understanding of the present invention, a discussion of such elements is not provided herein.

The present invention is more particularly described in the following examples that are intended to be illustrative only because numerous modifications and variations therein will be apparent to those skilled in the art. As used in the specification and in the claims, the singular for "a," "an" and "the" include plural referents unless the context clearly dictates otherwise.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consist essentially of" the recited component(s).

Any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It is noted that U.S. Patent Application Publication No. 2021/0063390 is related to certain aspects of the subject application and is hereby incorporated by reference herein in its entirety.

Reference will be made to the attached figures on which the same reference numerals are used throughout to indicate the same or similar components. With reference to the attached figures, which show certain embodiments of the subject invention, it can be seen that a reflectometer 50 can have a case 100 with a slot 110 in which a lateral flow test strip 10 with multiple discrete regions 30 can be inserted. The case can house circuitry for multiple reading heads 200 having scanning optics 210 that include a light source 212 and a light receiver 214. Incorporated with the circuitry can be a microprocessor 300 programmed with information that can be used to analyze and interpret light wavelength from the scanning optics. The case can have a display screen 120 for viewing the results of the test. There can also be one or more interface connectors 400 incorporated with the case and the circuitry to enable connection to an external device 450 for receiving and/or transmitting information from/to the microchip. Each of these general components can have one or more sub-components, which will be discussed in detail below.

The components of a reflectometer 50 can be enclosed within a case 100. The case can be hand-held and contains the circuitry, scanning optics, and other components for obtaining and analyzing information from a lateral flow test strip, or similar device inserted therein. The case can be constructed from any suitable material, such as plastics, nylon, metals, other materials, and/or combinations thereof. Ideally the material is inexpensive and suitable for disposal. It can also be preferable for the material to be opaque with a non-reflective surface, with regard to the wavelength of the light source, so as to inhibit background signals from stray reflection of light from the other discrete regions on a test strip. The case can also be configured to contain a battery or to be connected to another energy source with sufficient power to analyze a predetermined number of test strips, after which the reflectometer can be disposed in an appropriate fashion.

Figure 2:
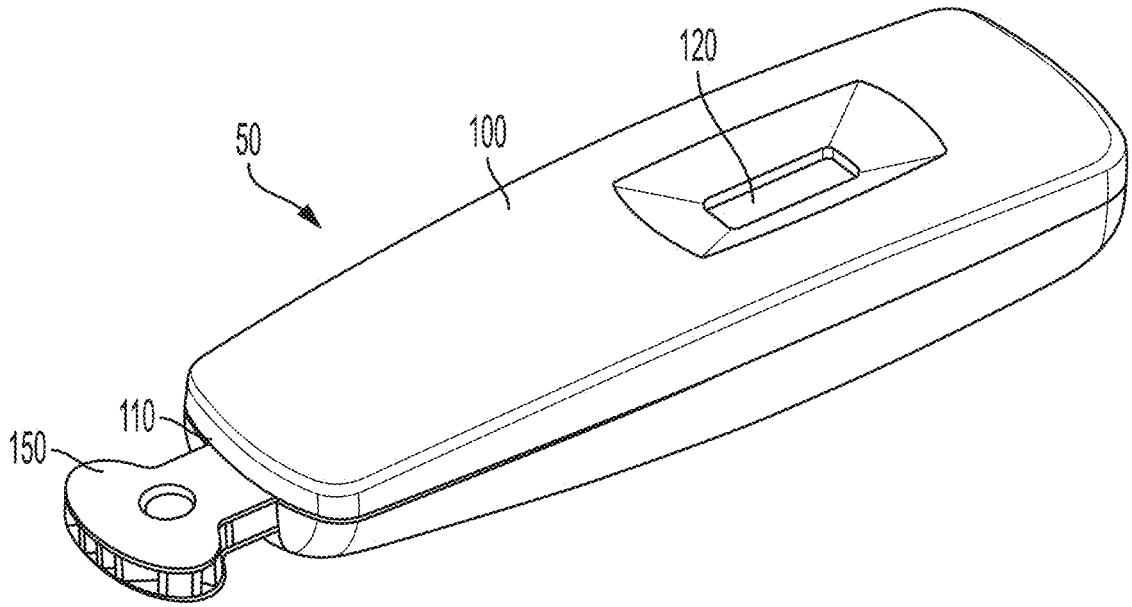
FIG. 2 illustrates how the cassette in FIG. 1 can be inserted into the case of the reflectometer.

The case can be configured with a slot 110 at a proximal end 2 through which a distal end 7 of a test strip 10 can be inserted to engage with a channel 112 that positions the test strip in correct alignment in the housing. When aligned, the scanning optics 210 in the respective reading heads 200 within the case can direct light at and receive reflected light from the discrete regions 30 on the test strip. FIGS. 1 and 2 illustrate an example of a case with a slot and channel for receiving a test strip (FIG. 1 shows a bottom surface of the case, and FIG. 2 shows an upper surface of the case). In a specific embodiment, the test strip has three discrete regions comprising a test zone 32 and two control zones 31 and 33. The control zones can be on a side of the test zone or there can be a control zone on each side of the test zone. The control zones can each have a known, different amount of immobilized detection moiety binding substance. The test zone can have an amount of immobilized analyte binding substance that is greater than the amount of analyte expected in a sample. The immobilized analyte binding substance in the test zone can be different from the immobilized detection moiety binding substance in the control zones.

Figure 9:
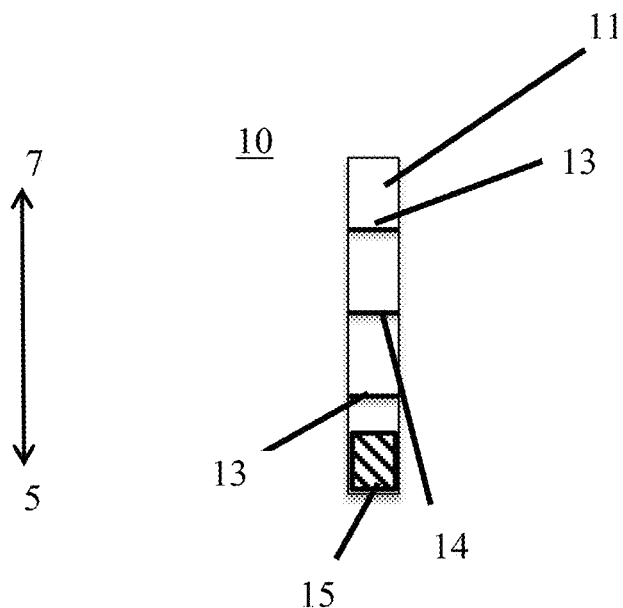
FIG. 9 shows a test strip that can be used with a reflectometer, according to an embodiment of the subject invention.

FIG. 9 shows a test strip 10 that can be used with a reflectometer, according to an embodiment of the subject invention. The test strip 10 can include a substrate 11, a test sample line 14, low and high test control lines 13, and optionally an absorber 15, which can be in direct physical contact with the substrate 11. The arrow at the left shows the proximal end 5 and the distal end 7 of the test strip 10. The cassette 150 can be inserted in the slot 110 of the reflectometer 50 such that the distal end 7 of the test strip 10 goes in first and the proximal end 5 of the test strip 10 is not in the case 100 of the reflectometer 50 but instead exposed and/or visible through the well 152 of the cassette 150.

In one embodiment, a test strip 10 is mounted within a cassette 150 that can be slidably inserted into the slot and channel towards the distal end 4 of the case. FIG. 1 illustrates an example of a cassette in which a test strip is mounted. As with the case, the cassette can comprise rigid or semi-rigid material having an opaque, non-reflective surface, with regard to the wavelength of the light source, so as to inhibit any background signal from stray light reflection from the other discrete regions. In one embodiment, a cassette is suitable for disposal in standard biohazard containers.

The cassette can be configured to allow insertion to a specific depth in the case, for example, there can be one or more stops 156 that inhibit the cassette from being inserted past a certain, prescribed point. FIG. 1 illustrates an example a cassette with stops that limit the insertion of the cassette, as shown in FIG. 2. When inserted to the full extent allowed by the cassette, the discrete regions can be in alignment with the scanning optics 210 in each of the reading heads 200, respectively, within the case. The cassette can have at least one well 152 in which a sample can be applied to the mounted test strip. In a further embodiment, the cassette can have walled-openings or viewing windows/slots 154 over the discrete regions 30 on the test strip, such as shown, for example, in FIG. 1. In one embodiment, the reading heads engage with the walled-openings, respectively, thereby forming at least a partially enclosed chamber in which the reading heads emit and receive light directed at respective discrete regions. The engagement need not provide a light-tight fit with the walled-opening.

Figure 17:
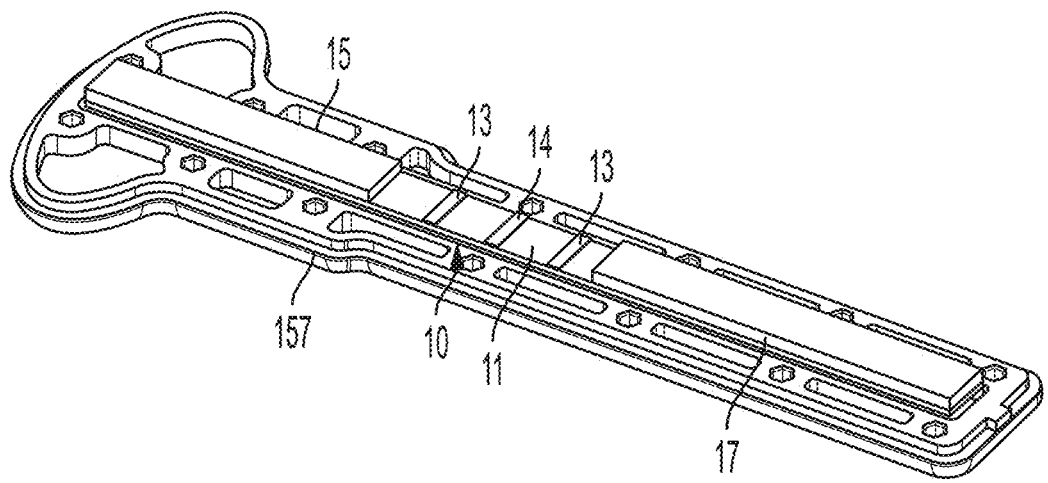
FIG. 17 shows a cutaway schematic view of a base of a cassette that can be used with a reflectometer.
Figure 18:
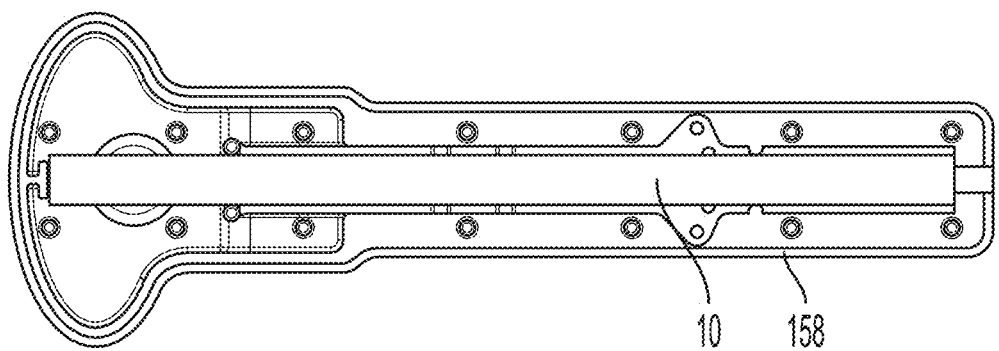
FIG. 18 shows a cutaway schematic view of a cover of a cassette that can be used with a reflectometer.
Figure 19:
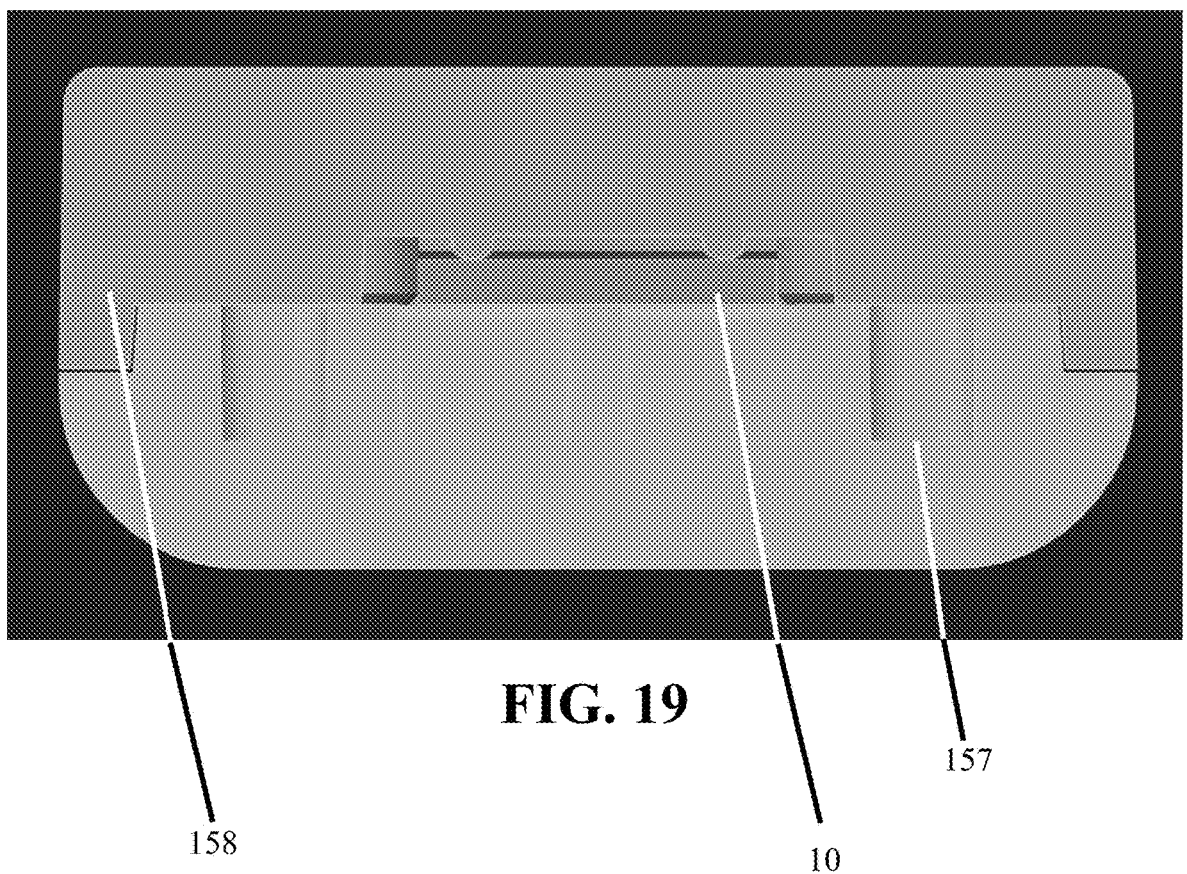
FIG. 19 shows a side view of a cassette that can be used with a reflectometer.

FIGS. 13-19 show various views of cassettes 150 that can be used with reflectometers 50, according to embodiments of the subject invention. The cassettes 150 in FIGS. 13 and 14 have slightly different shapes than those in FIGS. 15-19. Referring to FIGS. 15-19, a cassette 150 can include a base 157 and a cover 158. The cover 158 can include a well 152 and one or more stops 156 that can inhibit the cassette from being inserted past a certain, prescribed point. The cover 158 can further include slots/discrete regions 30 (including, e.g., a first control zone or one or more first control slots 31, a test zone or one or more test slots 32, and/or a second control zone or one or more second control slots 33). The cover can also include one or more holes 159, which can allow air to escape from the cassette 150 as test fluids chromatograph through the strip 10. Though FIGS. 13-19 show certain colors for various components of the cassette 150 and test strip 10, these are for illustrative purposes only and to help emphasize differences in components; these colors should not be construed as limiting. For example, the cover 158 and/or base 157 of the cassette 150 can be black (e.g., matte non-reflective (or low-reflectivity) black) in order to inhibit reflections. The absorbent 15 can be, for example, white. Also, though the test sample line 14 and low and high test control lines 13 are shown in FIG. 17 for illustrative purposes, these lines 13,14 can often be colorless and/or invisible (or mostly invisible) before a test is performed.

Figure 13:
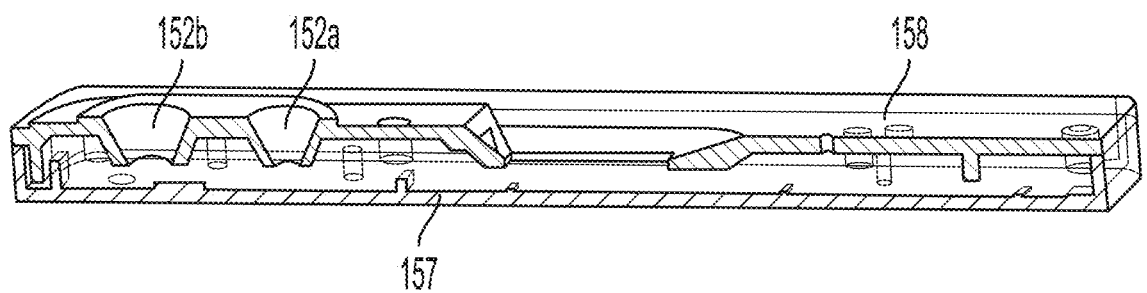
FIG. 13 shows a cross-sectional schematic view of a cassette that can be used with a reflectometer.
Figure 14:
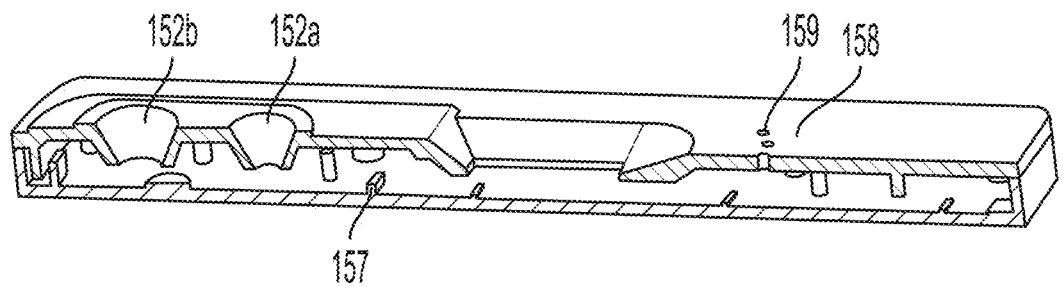
FIG. 14 shows a cross-sectional schematic view of a cassette that can be used with a reflectometer.
Figure 15:
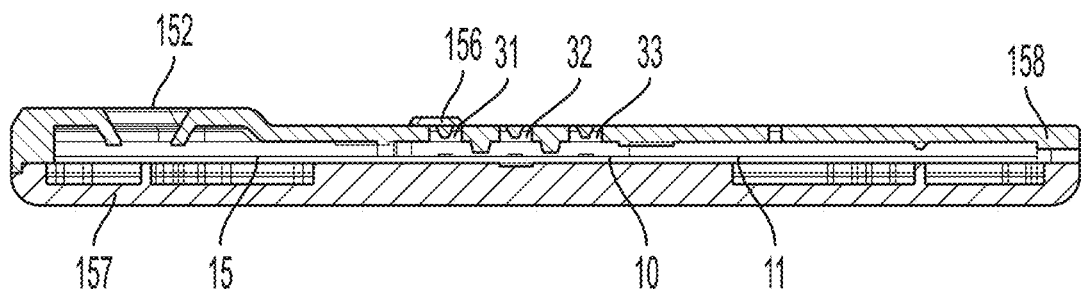
FIG. 15 shows a cross-sectional view of a cassette that can be used with a reflectometer.
Figure 16:
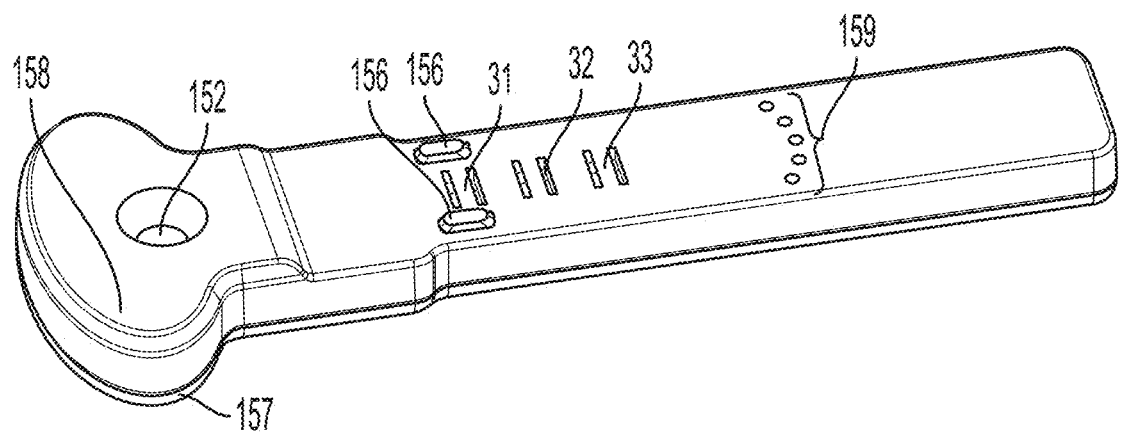
FIG. 16 shows a schematic view of a cassette that can be used with a reflectometer.

Referring to FIGS. 13 and 14, in an embodiment, the cassette 150 can have a first well 152a and a second well 152b, and the first well 152a can be disposed closer to the distal end 4 of the cassette 150 (i.e., the first well 152a can be located on the cassette 150 such that when the cassette 150 is inserted into a case 100, the first well 152a is closer to the case 100 than the second well 152b is). The first well 152a can be narrower than the second well 152b, though embodiments are not limited thereto. The embodiments with two wells 152a,152b as depicted in FIGS. 13 and 14 can include any or all of the features of the cassette 150 discussed herein and shown in the figures (e.g., FIGS. 15-19). A cassette 150 with two wells 152a,152b can be used, for example, for testing fluids that have a component that needs to be filtered out (e.g., whole blood, sputum). The test strip 10 can include a filter thereon at a location corresponding to the first well 152a, and the filter can be configured to filter whatever component is desired to be removed from the particular test fluid. For example, a cassette 150 with two wells 152a,152b can be used to test whole blood, and the test strip 10 can have a red blood filter at a location corresponding to the first well 152a. During testing, the whole blood can be provided to the first well 152a and, after it has absorbed on the test strip, a buffer solution (e.g., 50 microliters (μL), about 50 μL, or at least 50 μL) can be provided to the second well 152*b*. The buffer then initiates the chromatography, and can carry the colorless part of the blood (e.g., plasma or serum) to the control zones 31,33 and test zone 32 of the test strip 10. The colors produced by colloidal gold (a common detection moiety) tend to be red or reddish, so removal of red blood cells when testing whole blood is very important. A cassette 150 with one well 152 (e.g., as depicted in FIGS. 15-19) can be used for fluids where filtration of a substance is not needed (e.g., serum, plasma, saliva, urine).

Figure 10:
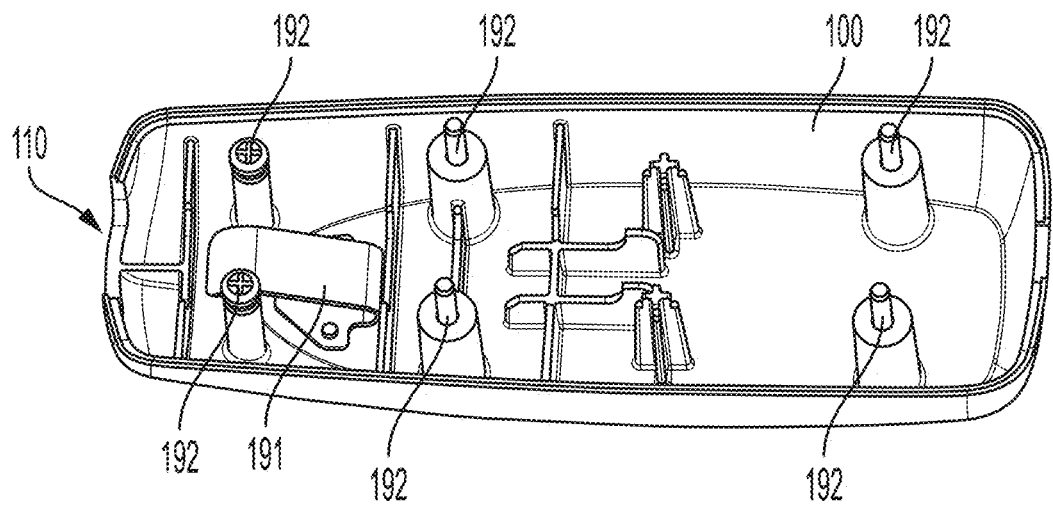
FIG. 10 shows a schematic view of a lower portion of the case of the reflectometer.
Figure 11:
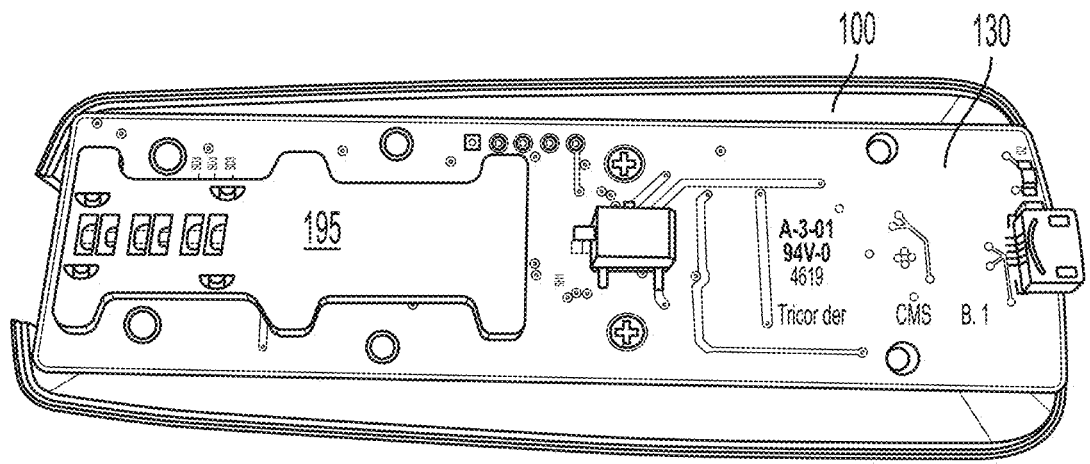
FIG. 11 shows an image of a lower portion of the case of the reflectometer, with a printed circuit board (PCB) and a baffle board.
Figure 12:
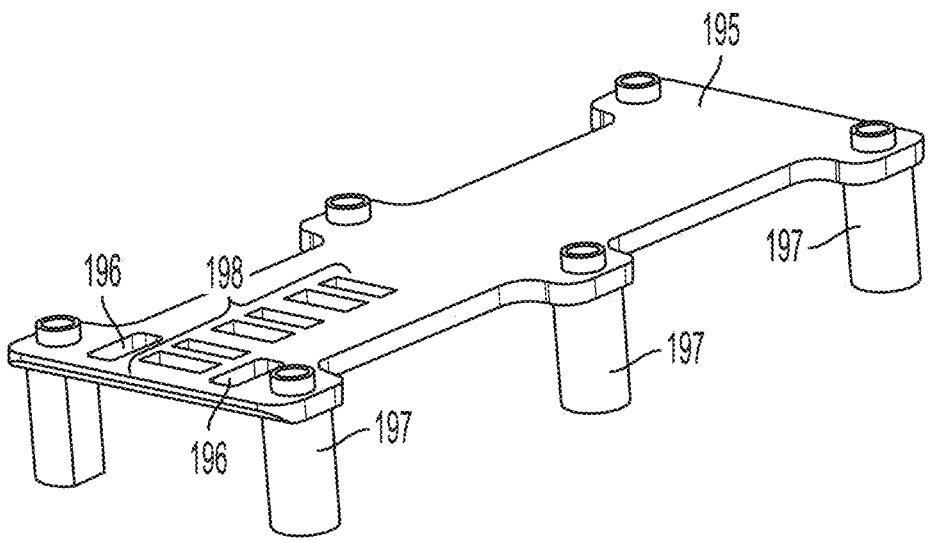
FIG. 12 shows a schematic view of a baffle board that can be used in a reflectometer to help hold a cassette in place.

In many embodiments, it is important that each cassette 150 slide into the same position within the case 100 of the reflectometer 50 in order to keep the distance from the test strip 10 surface to the scanning optics 210 the same (or about the same) for each test. In order to do this, the case 100 of the reflectometer 50 can include a spring clip 191 and/or a baffle board 195 to keep each cassette 150 in place. FIG. 10 shows a cutaway schematic view of a lower portion of the case 100 of the reflectometer 50, with certain elements missing so that the inside of the lower portion of the case 100 can be seen, and FIG. 11 shows an image of the lower portion of the case 100, including a baffle board 195 and a printed circuit board (PCB) 130, which can include the scanning optics 210. The lower portion of the case 100 can include a spring clip 191 that applies pressure to the cassette 150 to help keep it in place when it is slid in through the slot 110. The baffle board 195 can be mounted within the case 100 (e.g., using one or more posts 192 (e.g., screw posts)); that is, the baffle board 195 can include one or more legs 197 that can be respectively mounted to one or more posts 192. The PCB 130 can also be mounted within the case using one or more posts 192 (e.g., screw posts), and these can be the same posts 192 used for mounting the baffle board 195. The baffle board 195 can include one or more stopper slots 196, which can respectively receive the one or more stops 156 of the cassette 150 when it is inserted into the case 100 through the slot 110, thereby ensuring that each cassette 150 is inserted to the same depth. This, in combination with the spring clip 191, ensures that each cassette 150 will be locked in at an exact, predetermined position such that the test strip 10 for each test will be the same distance from the scanning optics 210 (this distance is also determined by the thickness of the cover 158 of the cassette 150, such that the distance will be the same as long as the thickness of the cover 158 of the cassette 150 is the same). The baffle board 195 can also include a plurality of viewing slots 198 that can allow viewing of the slots/discrete regions 30 of the cassette 150 during testing.

Within the reflectometer 50 is a reading head 200 that can comprise the scanning optics 210 for measuring the amount of detection moiety bound to each discrete region 30 on a test strip 10. To facilitate an understanding of the reflectometer embodiments of the subject invention, it can be beneficial to understand the basic concepts of a lateral flow immunology test. To use a lateral flow test strip, the liquid test sample is applied to a proximal end 5 of the test strip 10, such as in the well 152. A buffer (e.g., 2-3 drops, such as 100-200 microliters) can also be added with the sample in order to facilitate chromatography; the buffer can optionally be treated with other chemicals to help the reaction (e.g., an antibody, a chemical to give a particular pH, or a chemical to activate the antibodies of the test strip). The sample, containing or believed to contain the analyte of interest, (together with the buffer, if present) migrates towards the distal end 4,7 to encounter a conjugate release area on the test strip, where a detection moiety (colloidal gold, latex beads, etc.) immobilized in the conjugate release area becomes conjugated to the analyte of interest in the sample. This conjugated-analyte, along with other unbound detection moiety then migrates to the first discrete region 30. In one embodiment, this first discrete region is a first control zone 31 and the unbound detection moiety can bind to the immobilized material in the first control zone, but the conjugated-analyte will pass through. The sample continues to migrate to a next discrete region. In one embodiment, the next discrete region is a test zone 32 with an immobilized analyte binding-substance to which the conjugated-analyte can bind thereby capturing the detection moiety bound thereto. Any remaining conjugated-analyte and unbound detection moiety then migrates to the next discrete region. In one embodiment, the next discrete region is a second control zone 33, with a different amount of immobilized detection moiety binding-substance than the first control zone, to which the unbound detection moiety can bind. Conjugated-analyte in the sample will not bind to the second control zone. The amount of detection moiety bound to the immobilized material at each discrete region can be detected and measured with a reflectometer 50. For example, if the detection moiety is colloidal gold, each discrete region 30 will have a color that reflects at a particular and measureable wavelength, according to the amount of detection moiety bound to the specific zone. There can also be an absorption pad 17 at the distal end 4,7 to absorb sample that migrates to the distal end, which can also act to drive the test sample along the test strip and continue the reaction to completion. Typically, once the sample is applied to the test strip, it takes at least a few seconds (or at least a few minutes) for completion or stabilization of results.

Reflectometers of embodiments of the subject invention are advantageously configured to analyze the test zone and the control zones to provide a highly accurate measure of the analyte concentration in the sample. Once the reactions at the discrete regions 30 have sufficiently stabilized, reading heads within the case 200 can analyze each discrete region. In one embodiment, there is a dedicated reading head 200 for each discrete region 30. Thus, in the specific examples described above, the test zone, a first control zone, and a second control zone would each have a dedicated reading head. A reading head can comprise the scanning optics 210 necessary to measure the amount of conjugated-analyte and unbound detection moiety captured at each discrete region. Activation of the reflectometer 50 can begin the operation to detect and measure the wavelength of any developed color present in the discrete regions on the test strip. The reading head obtains the wavelength information, which is converted to a signal voltage level correlated to detected color according to detection moiety bound to the discrete region. The signal voltage level can be used with an algorithm and/or a lookup table (LOT) that correlates the signal voltage level with an analyte concentration. The analyte concentration can be output on the display screen 120 on the case. Alternatively or additionally, the information can be output through one or more interface connector 400 to an external device 450, such as, for example, a computer, phone, tablet, or other device for processing and analysis.

Figure 3:
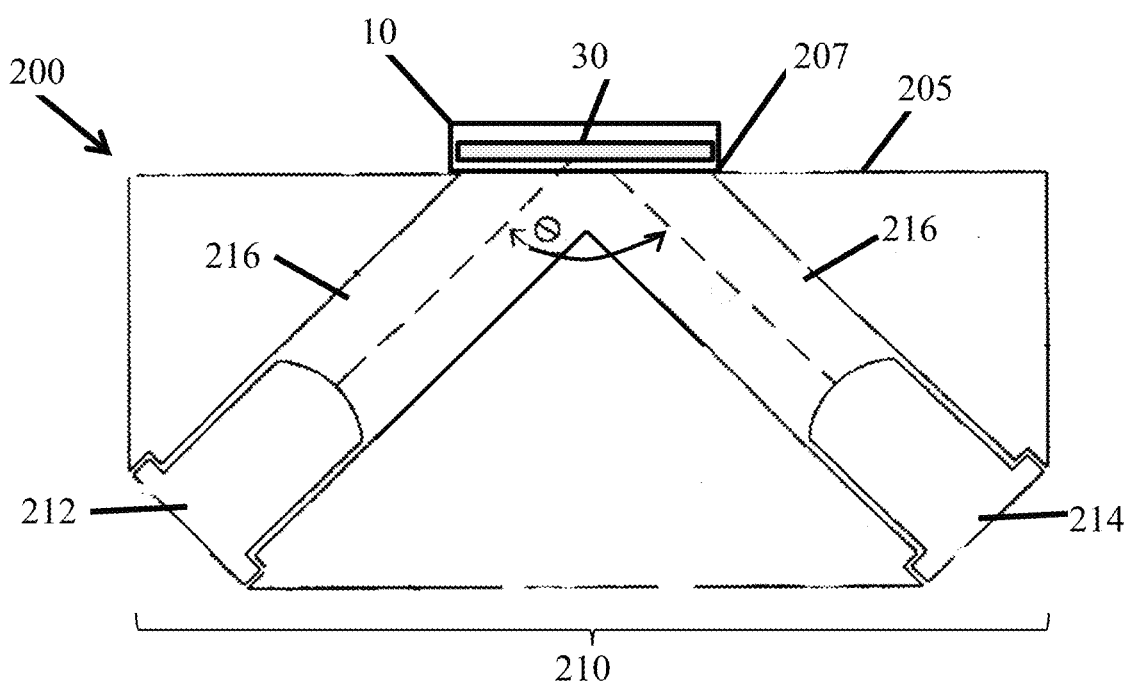
FIG. 3 is a cross-sectional view of a reading head, according to one embodiment of the subject invention. The reading head is shown engaged with a cassette to receive reflective information from the lateral flow strip.

With reference to FIG. 3, there is shown a cross-sectional view of a reading head 200 within a hand-held reflectometer 50 shown in FIGS. 1 and 2. The reading head 200 can include the scanning optics 210 that can analyze a discrete region 30. The scanning optics can include a light source 212 that emits light to illuminate the discrete region 30 where the detection moiety is bound. In one embodiment, a light source is a light emitting diode (LED) mounted in a support 205 at a specific angle Θ relative to a light-receiver 214 also mounted within the support. The light source can emit light of any suitable color with respect to the color wavelength to be detected. As an example, a green LED has been found to provide the most beneficial results in detecting the color shades that develop in the discrete regions when colloidal gold is used as the detection moiety. Other light source colors, such as, for example, LEDs of other colors (such as red or blue) can be used depending on the selected detection moiety. The support 205 can be constructed of materials like or similar to those used for the housing and/or the cassette, as previously described. The angle Θ can also be any angle that minimizes detection of specular reflection. In one embodiment, the angle Θ is approximately 35°, 36°, 37°, 38°, 39°, 40°, 41°, 42°, 43°, 44°, 45°, 46°, 47°, 48°, 49°, 50°, 51°, 52°, 53°, 54°, 55°, or an angle in a range between any two of the listed values. In a specific embodiment, the angle Θ is 45° or approximately 45°.

The light source 212 in a reading head 200 can have a relatively narrow projection angle with respect to its emitted light output. For example, an LED can have a projection angle of 15° or about 15°. In order to further focus the light towards the discrete region 30, the light output from the light source 212 can be directed along or through a light-focusing device 216, such as, for example, a collimator or a light-pipe, as shown in FIG. 3. The focused light can be directed through an opening 207 in the support 205 to illuminate the discrete region 30, as shown, for example, in FIG. 3. The position of the light source relative to the light-focusing device can be adjusted to alter the intensity of illumination on the discrete region 30 and the effects and instances of background signals and stray reflections. In the example shown in FIG. 3, if the light-source 212 is a green LED and the light-focusing device 216 is a light-pipe, the LED can be adjusted within the light pipe to achieve the desired illumination on the discrete region and minimize undesirable interferences.

In one embodiment, a light-receiver 214 is mounted with the support 205 in a reading head 200 and oriented at angle Θ, relative to the light-source 212 and with respect to the discrete region 30. In one embodiment, the light-receiver has a narrow viewing angle of between 10° (or approximately 10°) and 20° (or approximately 20°). For example, the light-receiver can be a phototransistor with a viewing angle of 15° or about 15°. Focused light from the light source 212 can pass through the opening 207 in the support 205 of the reading head 200 and be directed at the respective discrete region 30. Reflected light from the surface of the discrete region 30 on the test strip 10 can be directed along a second light-focusing device 216, such as, for example, a light pipe or collimator, towards the light-receiver. The second light-focusing device 216 can be the same type of device or a different type of device as the first light-focusing device 216. In the example shown in FIG. 3, if the light receiver 214 is a phototransistor and the second light-focusing device 216 is a light pipe, the phototransistor can be adjusted within the light pipe to alter the sensitivity and tolerance of the phototransistor in receiving the light reflected from the surface of the discrete region, and, thus, the ability of the reflectometer to read the wavelength and interpret the results. Ideally, the angle Θ of the light source, such as an LED, relative to the light receiver, such as a phototransistor, can minimize detection of specular reflection from the discrete surface of the test strip.

Figure 4A:
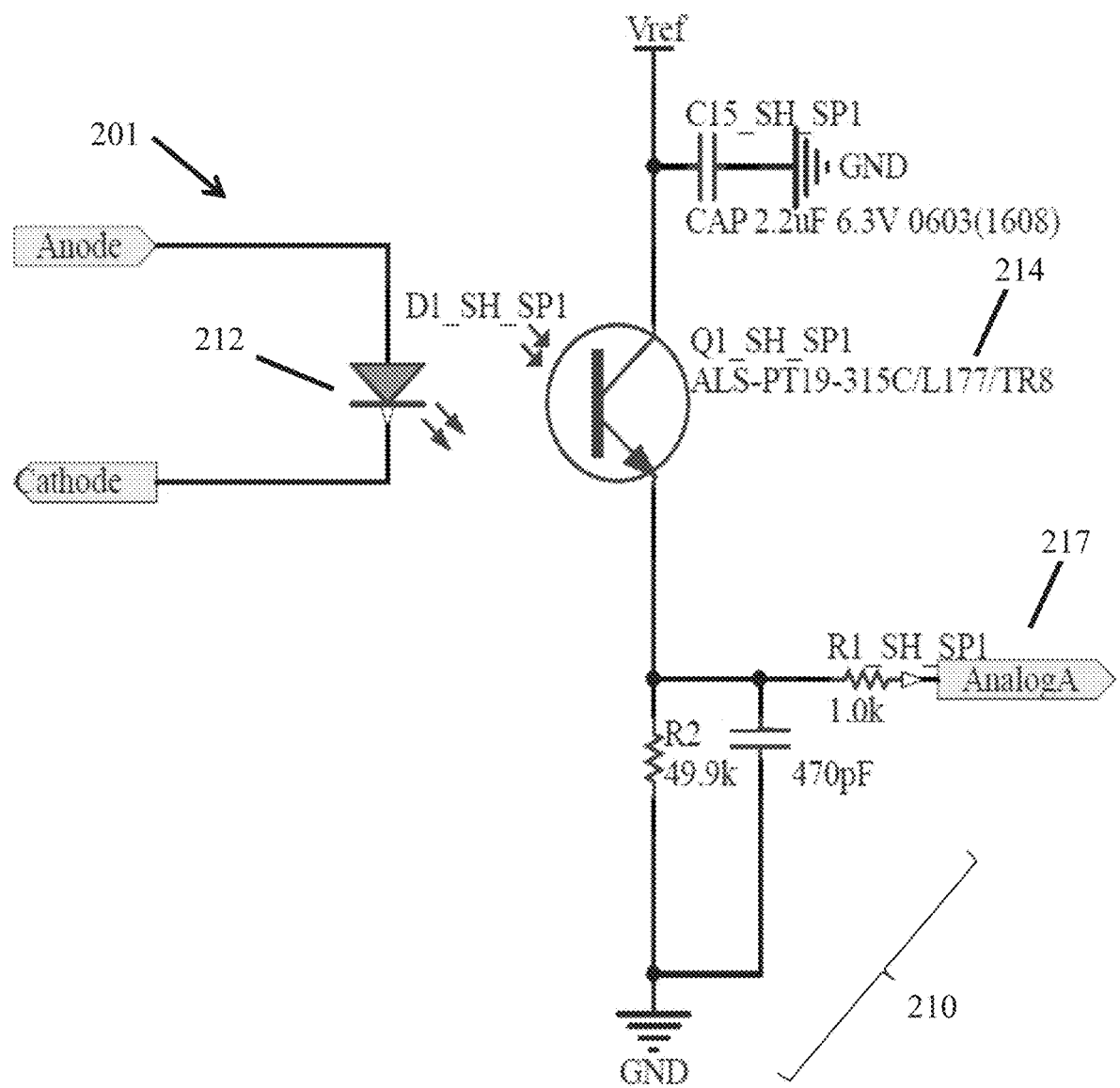
FIGS. 4A, 4B, and 4C show circuit schematics for a first reading head (4A), second reading head (4B), and third reading head (4C), according to one embodiment of the subject invention.
Figure 4B:
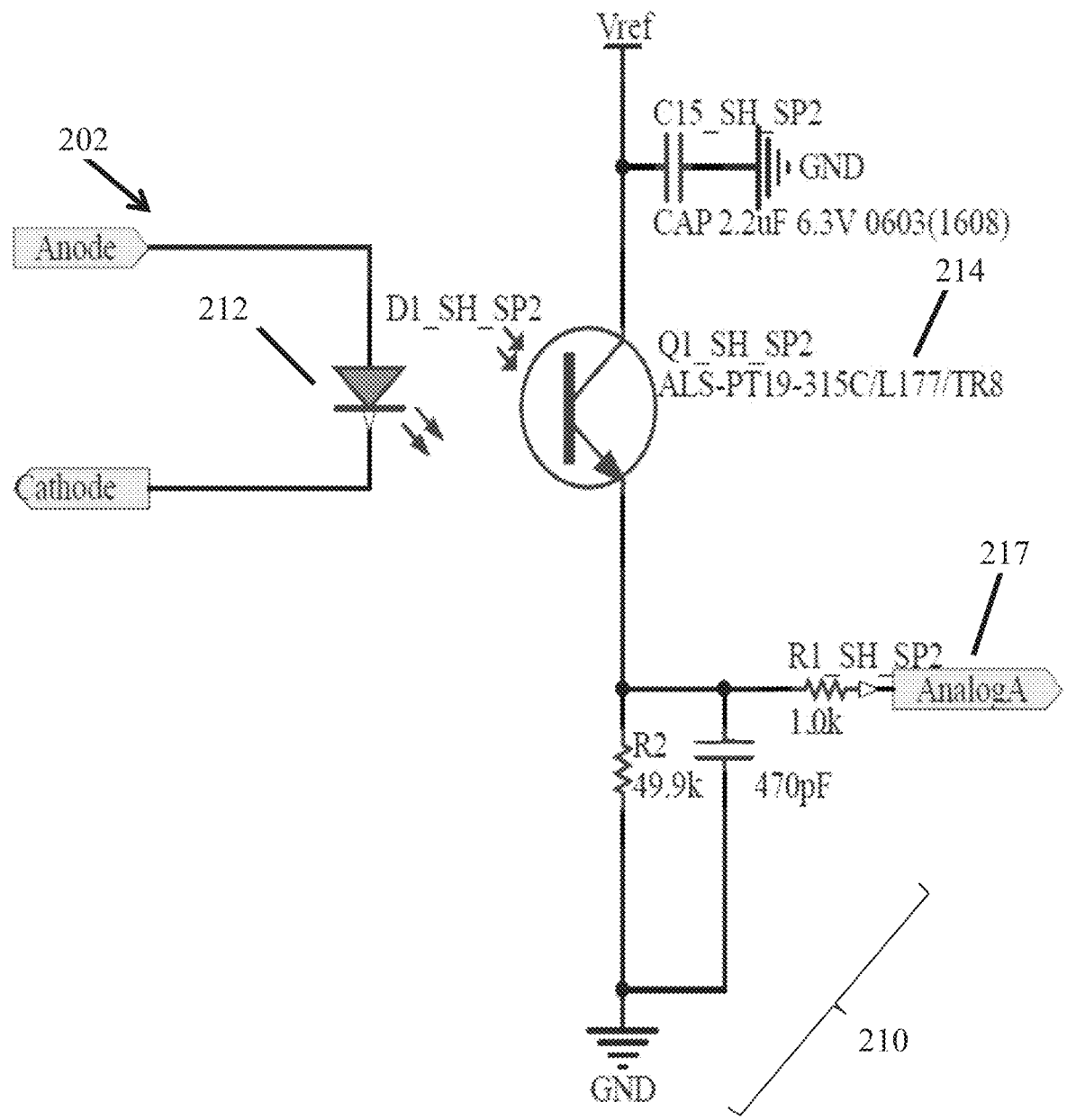
Figure 4C:
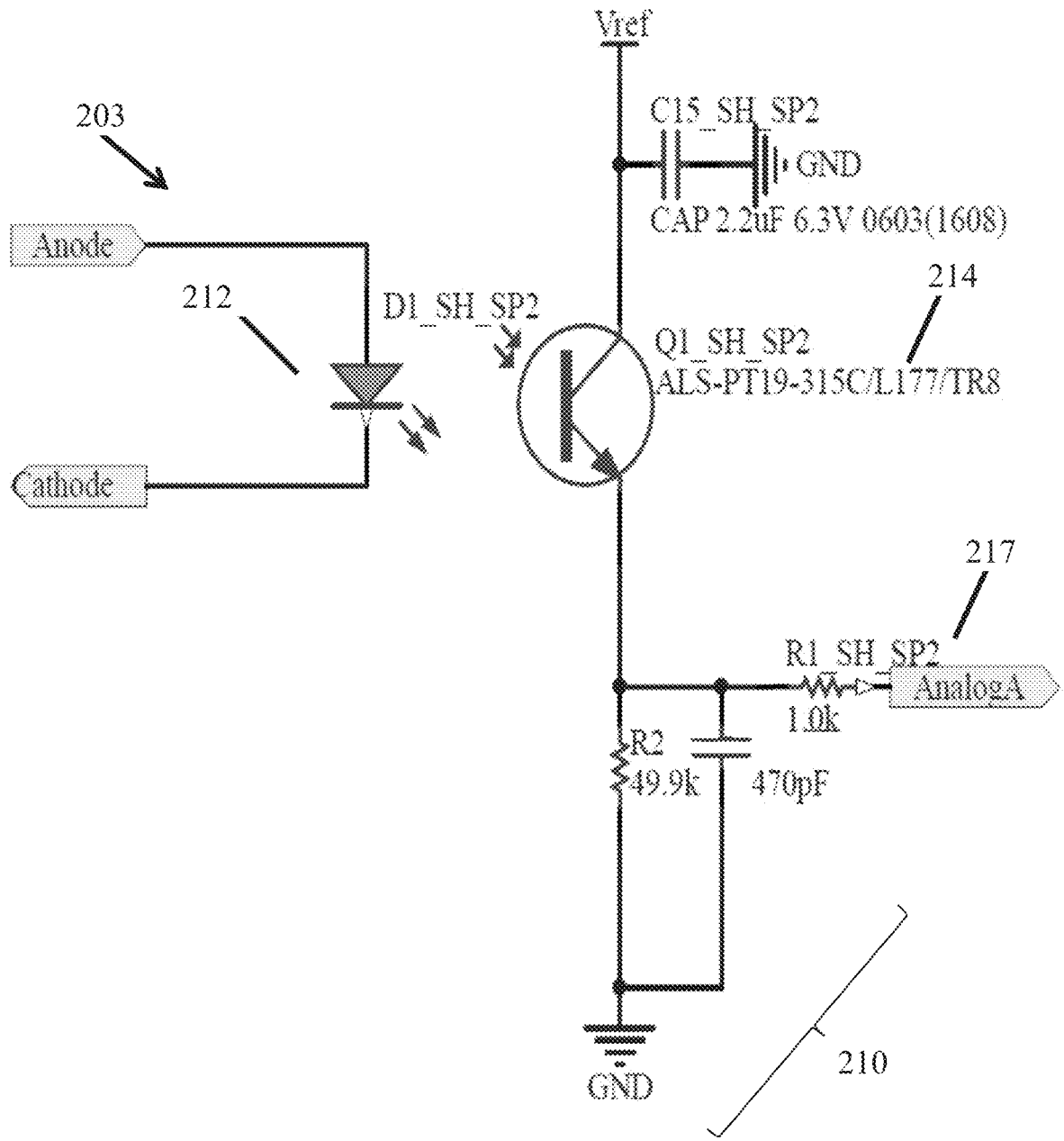
Figure 5:
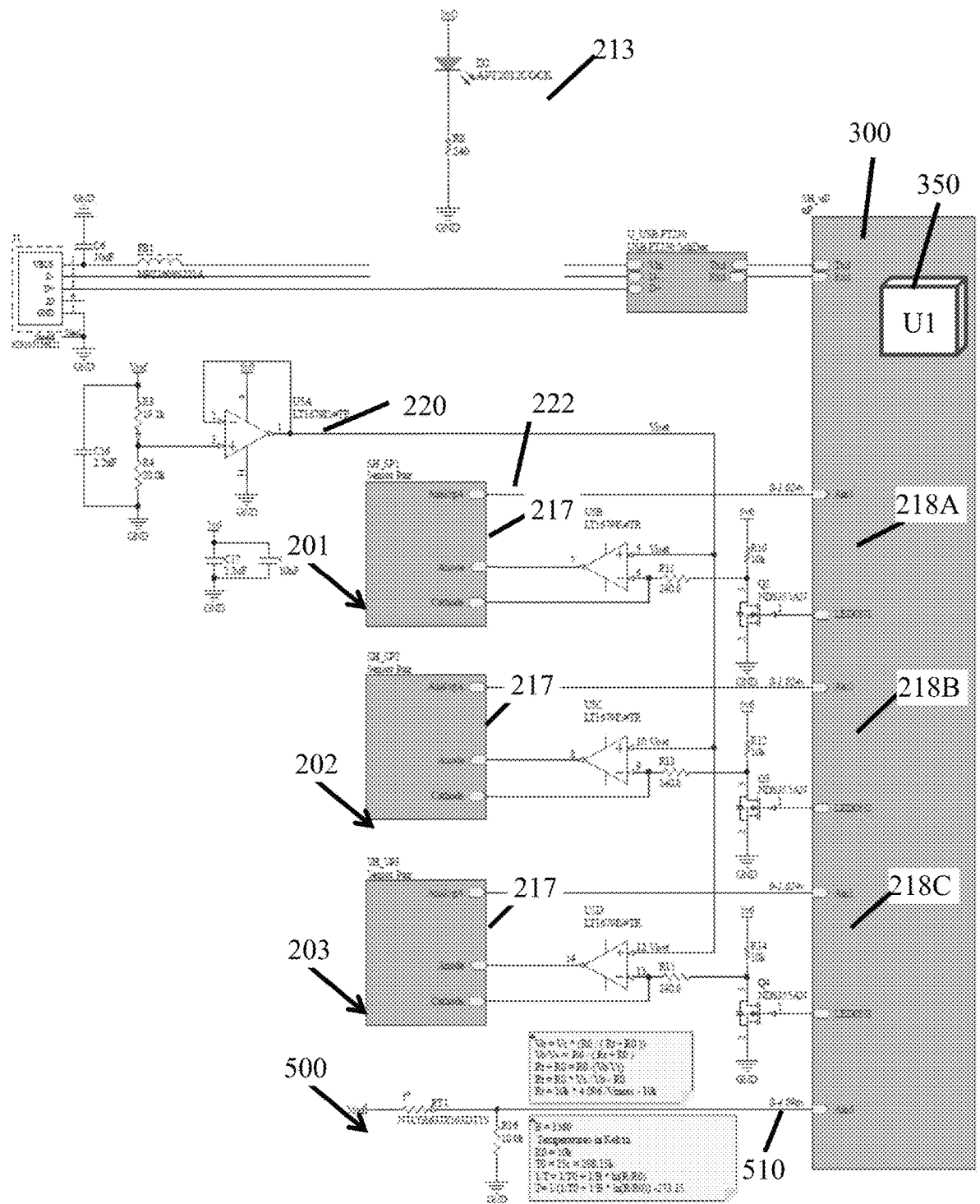
FIG. 5 shows the circuit schematics for a microchip with a microprocessor thereon for controlling the operation of the reflectometer, according to an embodiment of the subject invention. Also shown are the circuit schematics for a temperature sensor and background reflectance sensor.

FIGS. 4A, 4B, and 4C illustrate non-limiting examples of a configuration for the scanning optics 210 that can be employed in a first reading head 201, second reading head 202, and third reading head 203. In these examples, a green LED operates as the light source 212 that is detected by a NPN phototransistor that acts as the light receiver 214. The wavelength detected by the phototransistor in each reading head 201, 202, and 203 generates analog signals 217 that are transmitted to analog-to-digital converters 218A, 218B, and 218C, respectively, as shown in FIG. 5. An example circuit 213 for the display 120 is also shown.

As mentioned above, the case 100 and the supports 205 of the reading heads 200 can be manufactured from one or more materials that are non-reflective and opaque with respect to the wavelength utilized for the light source. This can inhibit interferences, such as stray reflectance, from adjacent discrete regions. The material of the test strip can also reflect light and can combine and interfere with the reflectance from the discrete region. This reflectance from the test strip material can also be interference and can obfuscate the detectable wavelength from a discrete region 30 and introduce inaccuracies. One option is to determine in advance the reflectance wavelength of the test strip material and calibrate that wavelength out of the final measurement. While helpful, this method may not account for differences between test strips or manufacturing lots of test strips. One embodiment of the subject invention utilizes a background light receiver 220 that receives reflected light from an area of the test strip material. The background light receiver can be paired with one of the light sources 212 in a reading head to provide a reflectance measurement from the test strip area.

FIG. 5 shows an embodiment of the partial circuitry of a reflectometer with a first reading head 201, second reading head 202, and third reading head 203, which each include a light source 212 and a light receiver 214, as shown, respectively, in FIGS. 4A, 4B, and 4C. Paired with one or more of the light sources (e.g., the light source of the third reading head) can be a background light receiver 220. The wavelength detected by the background light receiver, which can include a phototransistor, generates an analog signal 222 that can be transmitted to each reading head 201,202,203. The background light analog signal 222 can be analyzed by the microprocessor 300 along with the analog signals 217 from the reading heads, as shown in FIG. 5. The microprocessor can be programmed to compensate for the background light analog signal to provide a more accurate reading from the discrete regions 31,32,33.

Brightness and intensity of LED lights can be affected by temperature with respect to light output. As such, it can be important to measure the temperature near the LED light source and to compensate for temperature driven variations that may occur in the reflectance signal. In one embodiment, a reflectometer of the subject invention includes at least one temperature sensor 500. The temperature sensor can generate an output signal 510 that is indicative of temperature at or near the LED light sources. A temperature sensor can be disposed near each light source (or near only one or some of the light sources). The temperature sensor(s) can be disposed on or in the case 100 (for example, on or near the support 205 for the respective light source 212). As discussed briefly above, the intensity of the light output from the LEDs is affected by ambient temperature. As temperature increases, the intensity of the light output decreases. Conversely, as temperature decreases, the intensity of the light output increases. Accounting for any temperature changes at the light source is thus imperative in order to ensure that the detected steady DC voltage is an accurate representation of color and shade. In one embodiment, the temperature sensor in a reflectometer comprises a thermistor. In a further embodiment, the thermistor is in operable communication with the microprocessor 300, as shown in FIG. 5. The temperature analog signal 510 is transmitted to the microprocessor, which is programmed to convert the analog signal to a value that can be used to compensate for the temperature interference with analog signals 217 obtained from the readings heads.

Figure 6:
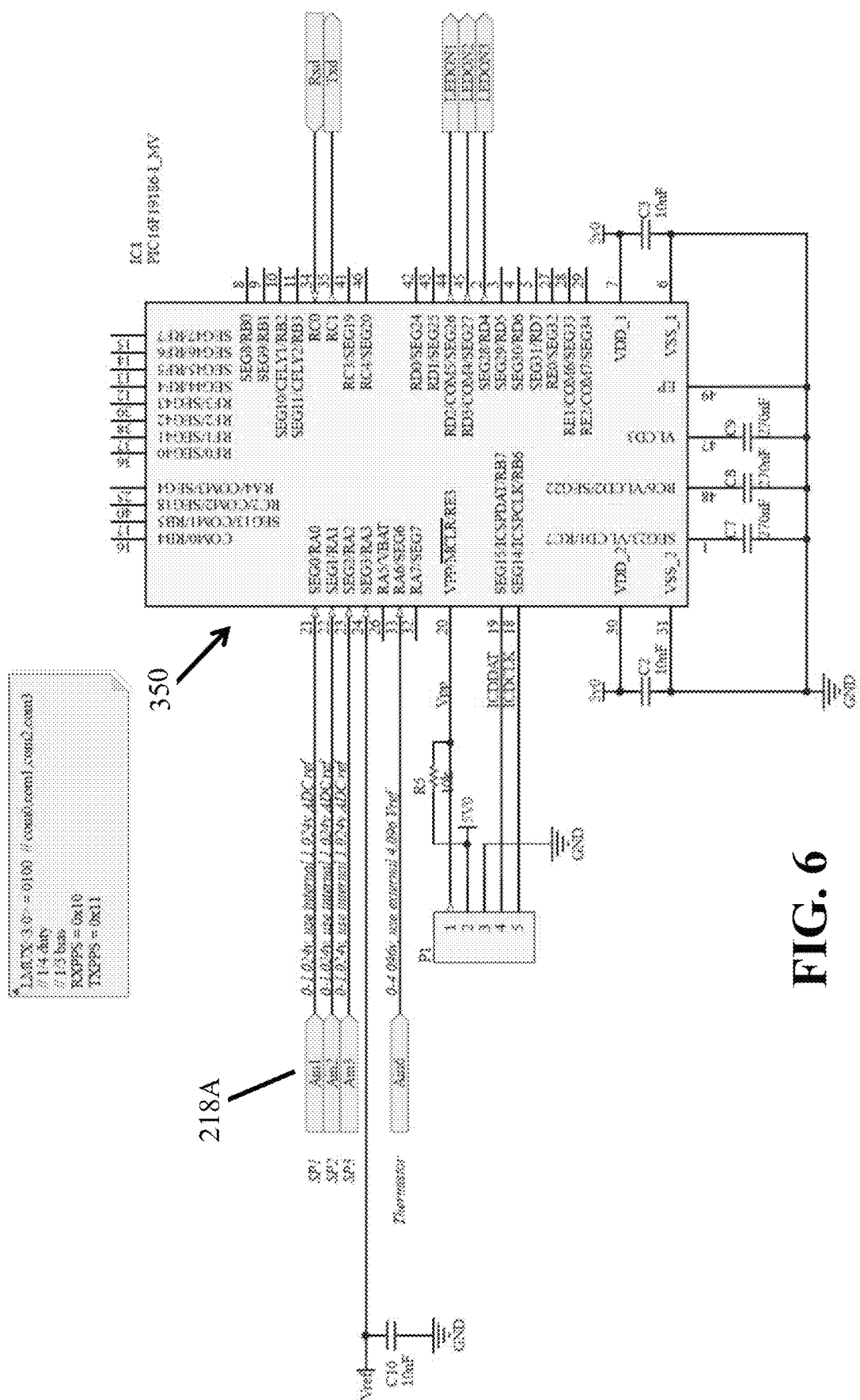
FIG. 6 shows the circuit schematics for a microprocessor that can be used to control the operations of a reflectometer, according to an embodiment of the subject invention.

In one embodiment, the operations of the reflectometer 50 are controlled by a microprocessor 300. In a more specific embodiment, the operations of the reflectometer are controlled by a microprocessor on a microchip 350. Each of the first reading head 201, second reading head 202, and third reading head 203 can also be operatively attached to the microchip 350 to be controlled by the microprocessor. FIG. 6 illustrates a non-limiting example of a microprocessor 300 that can be utilized on a microchip 350 within a reflectometer 50, as shown, for example, FIG. 5. As shown in FIGS. 5 and 6, the microprocessor can be used to control the operation of the light source 212 and each of the analog-to-digital converters, 218A-218C, can transmit information to the microchip for processing. In one embodiment, the microprocessor also receives the analog temperature signal 217 and the background signal 222 and analyzes those signals to compensate for the respective interferences with the reading heads analog signals 217.

Figure 7:
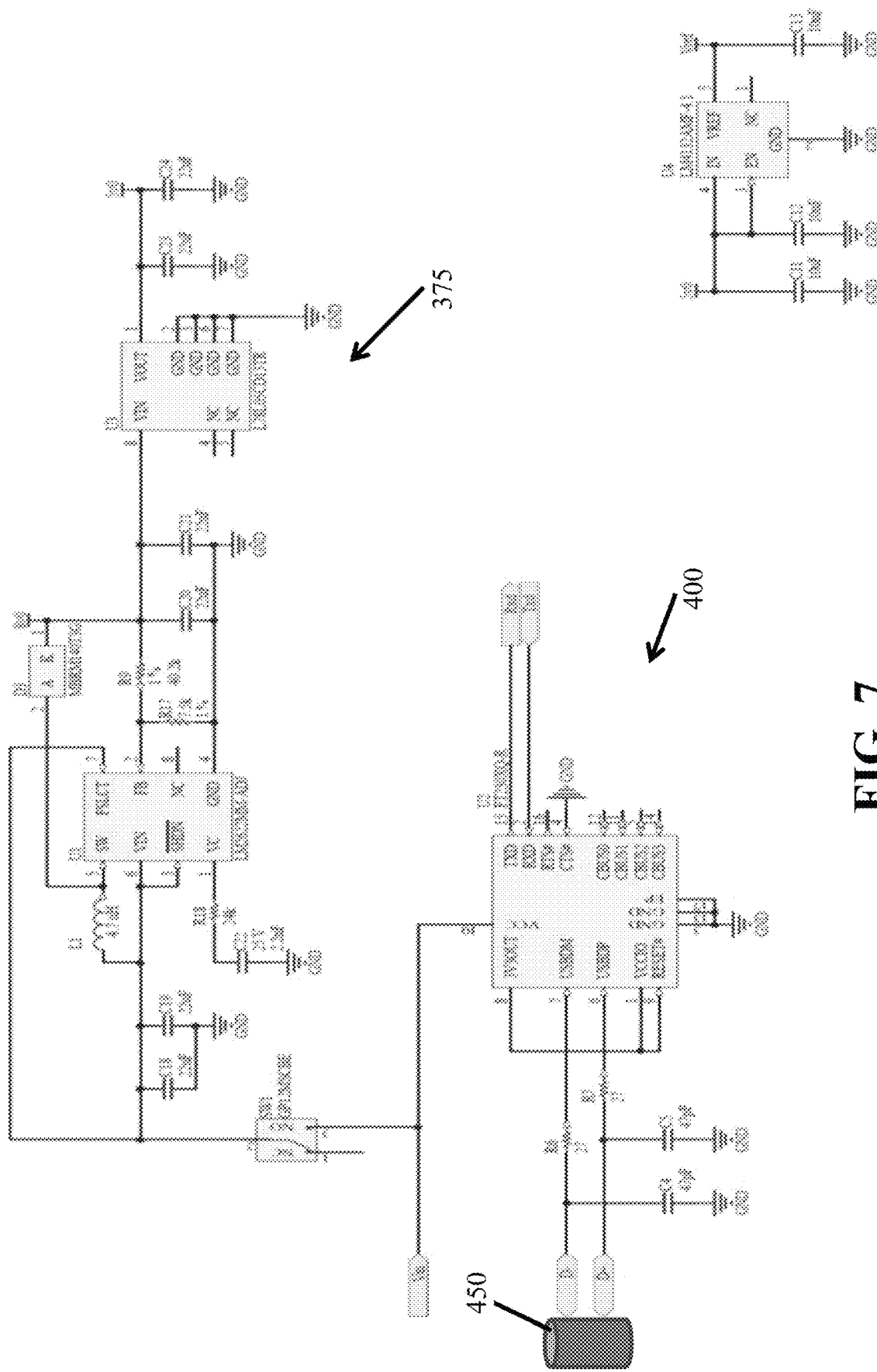
FIG. 7 shows the circuit schematics for interface connectors operably connected to a microchip, according to an embodiment of the subject invention. Also shown is a voltage converter for converting the analog signal from the reading head to a digital signal that can be transmitted to a microprocessor for analysis.
Figure 20:
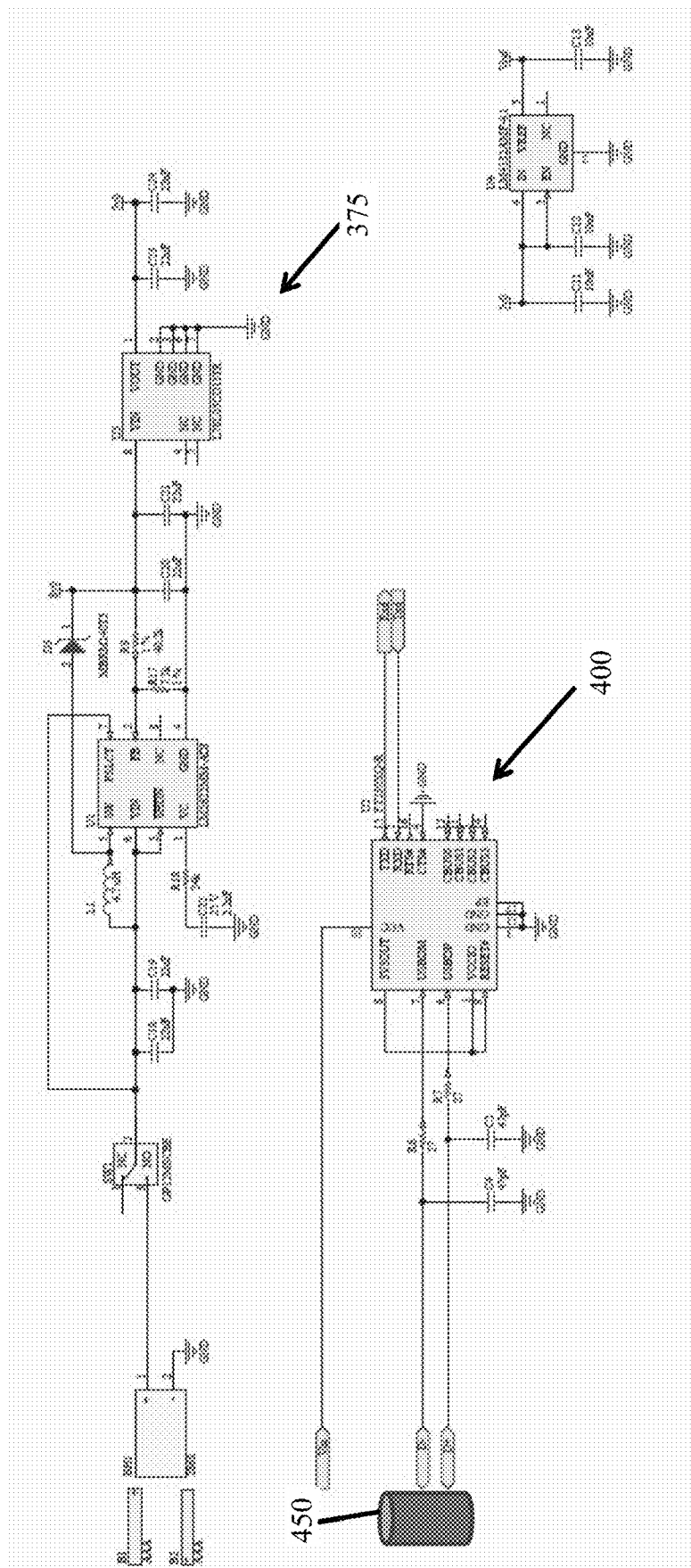
FIG. 20 shows circuit schematics for interface connectors operably connected to a microchip, according to an embodiment of the subject invention. Also shown is a voltage converter for converting the analog signal from the reading head to a digital signal that can be transmitted to a microprocessor for analysis.

In one embodiment, the microprocessor 300 is functionalized for analog-to-digital conversion for converting the analog signals 217 from each of the reading heads, 201,202, 203 to digital values. The digital values can be further processed by the microprocessor to the detected analyte concentration. FIGS. 7 and 20 illustrate two examples of an analog-to-digital circuit 375. The detected analyte concentration information, generated by the analog-to-digital circuit, can then be shown on the display screen 120 (which can be in operable communication with the microprocessor) of the reflectometer. The analyte concentration can also be stored in the microprocessor for later retrieval, consideration, and/or transfer. The microchip 350 can have a further operable connection to one or more interface connectors 400, for example, a Universal Serial Bus (USB), for transmission of the analyte concentration information to an external device 450, such as, but not limited to, a personal computer, cell phone, tablet, and other devices. If necessary or desired, additional computations can be conducted on the information by the external device.

Figure 8:
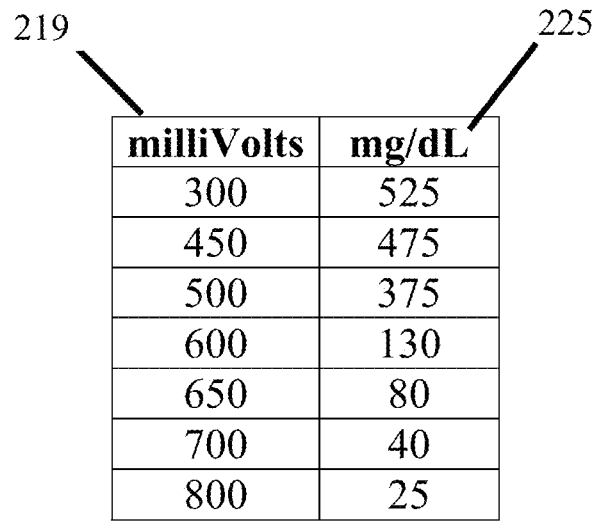
FIG. 8 shows an example of a lookup-table (LOT) that can be utilized by the microprocessor to determine an analyte concentration.

The analog signals 217A,217B,217C from the respective light receiver 214 in each reading head 200 are processed by the microprocessor 300 to generate a digital value 219 for the wavelength received by the light receiver. The digital value can be compared by the microprocessor 300 to a stored LOT 310 that correlates the digital value to an analyte concentration 225. FIG. 8 illustrates a non-limiting example of a LOT where a digital value that has been converted to millivolts (mV) can be correlated to an analyte concentration (mg/dL). Alternatively, the microprocessor can be programmed with an appropriate algorithm that utilizes the digital values to calculate an analyte concentration. In one embodiment, reflectometer data (such as a manufacturing batch code for the test strip 10) and type of test to be performed (for example, vitamin D concentration vs. D-dimer concentration in blood serum) identifies which one of a plurality of stored LOTs or algorithms should be utilized by the processor in evaluating the digital values to determine the corresponding analyte concentration.

In one embodiment, a lateral flow test strip having a test zone, a first control zone, with a first amount of detection-moiety binding material, and a second control zone, with a second amount (different from the first amount) of detection-moiety bind material, is analyzed with a reflectometer 50. The microprocessor, in utilizing the analog signals generated by the reflection from the zones, can determine the analyte concentration in the test zone 32 by first processing the analog signals from the control zones to establish digital values that represent a high end standard and a low end standard for the particular test strip. A digital value can also be calculated for the analog signal generated by the background light receiver 222 and that value can be removed from the digital values calculated for the high end standard and the low end standard. Each of the standards can be extrapolated to a model curve. The digital value calculated for the test zone 32 can then be interpolated based on the extrapolated high and low end standards. The interpolated test zone digital value can then be utilized with a LOT to determine the analyte concentration for the sample. As described above, a digital value for the background reflectance of the test strip material can also be used in the analysis to improve accuracy of results.

Lateral flow immunochemistry tests are easy to administer and can provide relative quick results. The past limitations of such tests have been the inability to accurately quantify results. The embodiments of the subject invention provide advantageous devices and methods for accurately quantifying the results from a lateral flow immunology test strip by utilizing multiple controls that establish high and low end standards within which test results can be interpolated more accurately. Background interference is also compensated for to further improve accuracy.

The subject invention includes, but is not limited to, the following exemplified embodiments.

Embodiment 1. A reflectometer (e.g., for lateral flow immunological tests), comprising:
  a case;
  a first reading head comprising first scanning optics configured to illuminate a first control zone of a test strip and receive first light from the first control zone;
  a second reading head comprising second scanning optics configured to illuminate a text zone of the test strip and receive second light from the test zone;
  a third reading head comprising third scanning optics configured to illuminate a second control zone of the test strip and receive third light from the second control zone; and
  a microprocessor in operable communication with the first reading head, the second reading head, and the third reading head,
  wherein the microprocessor is configured to: receive and analyze a first analog signal, a second analog signal, and a third analog signal corresponding to the first light, the second light, and the third light, respectively; and determine a first level of an analyte in the first control zone based on the first light, a second level of the analyte in the test zone based on the second light, a third level of the analyte in the second control zone based on the third light, and an overall level of the analyte in the test solution based on the first level, the second level, and the third level.

Embodiment 2. The reflectometer according to embodiment 1, wherein the first reading head comprises a first support disposed in the case, a first light source disposed on the support, and a first light receiver disposed on the support,
  wherein the second reading head comprises a second support disposed in the case, a second light source disposed on the support, and a second light receiver disposed on the support, and wherein the third reading head comprises a third support, a third light source disposed on the support, and a third light receiver disposed on the support.

Embodiment 3. The reflectometer according to embodiment 2, wherein the first light source and the first light receiver are disposed on the first support such that a first angle between a path of light emitted from the first light source and a path of light received by the first light receiver is in a range of 35° to 55°,
- wherein the second light source and the second light receiver are disposed on the second support such that a second angle between a path of light emitted from the second light source and a path of light received by the second light receiver is in a range of 35° to 55°, and
- wherein the third light source and the third light receiver are disposed on the third support such that a third angle between a path of light emitted from the third light source and a path of light received by the third light receiver is in a range of 35° to 55°.

Embodiment 4. The reflectometer according to embodiment 3, wherein the first angle is about 45°,
- wherein the second angle is about 45°, and
- wherein the third angle is about 45°.

Embodiment 5. The reflectometer according to any of embodiments 2-4, wherein the first light source is a light emitting diode (LED),
- wherein the second light source is an LED, and
- wherein the third light source is an LED.

Embodiment 6. The reflectometer according to any of embodiments 2-5, wherein the first light receiver is a phototransistor,
- wherein the second light receiver is a phototransistor, and
- wherein the third light receiver is a phototransistor.

Embodiment 7. The reflectometer according to any of embodiments 2-6, wherein the first reading head further comprises at least one first light-focusing device disposed on the first support,
- wherein the second reading head further comprises at least one second light-focusing device disposed on the second support, and
- wherein the third reading head further comprises at least one third light-focusing device disposed on the third support.

Embodiment 8. The reflectometer according to embodiment 7, wherein the at least one first light-focusing device comprises at least one of a light piper and a collimator,
- wherein the at least one second light-focusing device comprises at least one of a light piper and a collimator, and
- wherein the at least one third light-focusing device comprises at least one of a light piper and a collimator.

Embodiment 9. The reflectometer according to any of embodiments 1-8, wherein the microprocessor converts the first analog signal, the second analog signal, and the third analog signal to a first digital signal, a second digital signal, and a third digital signal, respectively, and compares the first digital signal, the second digital signal, and the third digital signal to at least one look-up table to determine the first level of the analyte, the second level of the analyte, and the third level of the analyte based on the first digital signal, the second digital signal, and the third digital signal, respectively.

Embodiment 10. The reflectometer according to any of embodiments 1-9, wherein the case comprises a slot at a first end thereof, the slot being configured to receive a cassette comprising the test strip.

Embodiment 11. The reflectometer according to any of embodiments 1-10, wherein the case comprises a baffle board mounted within the case and configured to ensure that a distance from the first reading head to the test strip, a distance from the second reading head to the test strip, and a distance from the third reading head to the test strip is consistent across different test strips.

Embodiment 12. The reflectometer according to embodiment 11, wherein the baffle board comprises:
- a plurality of legs respectively mounted to a plurality of posts within the case;
- at least one stopper slot configured to receive at least one stop of a cassette comprising the test strip; and
- a plurality of viewing slots configured to align with the first control zone, the test zone, the second control zone, the first reading head, the second reading head, and the third reading head.

Embodiment 13. The reflectometer according to any of embodiments 1-12, further comprising a spring clip disposed in the case, wherein the spring clip is configured to hold in place a cassette comprising the test strip.

Embodiment 14. The reflectometer according to any of embodiments 1-13, further comprising a circuit board disposed in the case, wherein the microprocessor is disposed on the circuit board.

Embodiment 15. The reflectometer according to any of embodiments 1-14, the test solution being a biological test solution.

Embodiment 16. The reflectometer according to any of embodiments 1-15, wherein the case comprises a display screen in operable communication with the microprocessor and configured to display the overall level of the analyte.

Embodiment 17. The reflectometer according to any of embodiments 1-16, further comprising at least one interface connector incorporated in the case and configured to connect to at least one external device.

Embodiment 18. The reflectometer according to any of embodiments 1-17, further comprising a temperature sensor in operable communication with the microprocessor and configured to measure a temperature within the case and generate an output signal indicative of a temperature of at least one of the first reading head, the second reading head, and the third reading head,
- wherein the microprocessor is configured to utilize the output signal to compensate for temperature interference when determining the overall analyte level.

Embodiment 19. The reflectometer according to any of embodiments 1-18, further comprising a background light receiver in operable communication with the microprocessor and configured to receive reflected light from an area of the test strip and generate a reflected light analog signal,
- wherein the microprocessor is configured to utilize the reflected light analog signal to compensate for background light when determining the overall analyte level.

Embodiment 20. The reflectometer according to any of embodiments 1-19, wherein the first level of the analyte in the first control zone and the third level of the analyte in the second control zone are utilized to establish a high end standard and a low end standard, respectively, to which the second level of the analyte in the test zone is compared.

Embodiment 21. A method of measuring an overall level of an analyte in a test solution, the method comprising:
- providing the reflectometer according to any of embodiments 1-20;

providing the test strip to the reflectometer; and
providing the test solution to the test strip to receive from the reflectometer the overall level of the analyte in the test solution.

Embodiment 22. A kit for measuring an overall level of an analyte in a test solution, the kit comprising:
a test strip (e.g., at least one test strip);
a cassette configured to receive the test strip (e.g., at least one cassette, each of which can be disposable); and
the reflectometer according to any of embodiments 1-19.

Embodiment 23. The kit according to embodiment 22, wherein the test strip comprises at least one of: an absorber at a proximal end thereof; and an absorption pad at a distal end thereof.

Embodiment 24. The kit according to any of embodiments 22-23, wherein the cassette comprises at least one well on an upper surface thereof, the at least one well comprising an opening configured to expose the test strip and to accept the test solution (and/or a buffer solution) so it can reach the test strip.

Embodiment 25. The kit according to any of embodiments 22-23, wherein the cassette comprises a first well and a second well on an upper surface thereof, the first well comprising a first opening configured to expose the test strip (e.g., a portion of the test strip having or being near a filter (e.g., a red blood cell filter)) and to accept the test solution so it can reach the test strip, and the second well comprising a second opening (which can be wider than the first opening) configured to expose the test strip and to accept a buffer solution (e.g., so it can initiate chromatography and/or help the test solution go to the test zone of the test strip).

Embodiment 26. The kit according to any of embodiments 22-25, wherein the cassette comprises at least one stop on an upper surface thereof configured to inhibit the cassette from being inserted past a certain, predetermined point within the reflectometer.

Embodiment 27. The kit according to any of embodiments 22-26, wherein the cassette comprises a plurality of holes on an upper surface thereof configured to allow air to escape from within the cassette.

Embodiment 28. The kit according to any of embodiments 22-27, wherein the cassette comprises a plurality of viewing slots on an upper surface thereof configured to align with the first control zone, the test zone, the second control zone, the first reading head, the second reading head, and the third reading head.

Embodiment 29. A method of measuring an overall level of an analyte in a test solution, the method comprising:
providing the kit according to any of embodiments 22-28;
providing the test strip to the reflectometer; and
providing the test solution to the test strip to receive from the reflectometer the overall level of the analyte in the test solution.

Embodiment 30. The reflectometer according to any of embodiments 1-20, the method according to embodiment 21, the kit according to any of embodiments 22-28, or the method according to embodiment 29, wherein the test strip has any or all of the features as described herein for test strips.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and other publications referred to or cited herein are incorporated by reference in their entirety, including all figures and tables, to the extent they are not inconsistent with the explicit teachings of this specification. Additionally, the entire contents of the references cited within the references cited herein are also entirely incorporated by reference. In particular, U.S. Pat. No. 6,574,425 and U.S. Patent Application Publication No. 2021/0063390 are incorporated herein by reference in their entireties.

What is claimed is:

1. A reflectometer, comprising:
a case;
a first reading head comprising first scanning optics configured to illuminate a first control zone of a test strip and receive first light from the first control zone;
a second reading head comprising second scanning optics configured to illuminate a test zone of the test strip and receive second light from the test zone;
a third reading head comprising third scanning optics configured to illuminate a second control zone of the test strip and receive third light from the second control zone; and
a microprocessor in operable communication with the first reading head, the second reading head, and the third reading head,
wherein the microprocessor is configured to: receive and analyze a first analog signal, a second analog signal, and a third analog signal corresponding to the first light, the second light, and the third light, respectively; and determine a first level of an analyte in the first control zone based on the first light, a second level of the analyte in the test zone based on the second light, a third level of the analyte in the second control zone based on the third light, and an overall level of the analyte in the test solution based on the first level, the second level, and the third level,
wherein the first reading head comprises a first support disposed in the case, a first light source disposed on the support, and a first light receiver disposed on the support,
wherein the second reading head comprises a second support disposed in the case, a second light source disposed on the support, and a second light receiver disposed on the support,
wherein the third reading head comprises a third support, a third light source disposed on the support, and a third light receiver disposed on the support,
wherein the reflectometer is configured such that the first light source, the second light source, and the third light source all provide light at a same wavelength as each other, and
wherein the reflectometer is calibrated for use with a specific lot of test strips.

2. The reflectometer according to claim 1, wherein the first light source and the first light receiver are disposed on the first support such that a first angle between a path of light emitted from the first light source and a path of light received by the first light receiver is in a range of 35° to 55°,
wherein the second light source and the second light receiver are disposed on the second support such that a second angle between a path of light emitted from the second light source and a path of light received by the second light receiver is in a range of 35° to 55°, and
wherein the third light source and the third light receiver are disposed on the third support such that a third angle between a path of light emitted from the third light source and a path of light received by the third light receiver is in a range of 35° to 55°.

3. The reflectometer according to claim 1, wherein the first light source is a light emitting diode (LED),
wherein the second light source is an LED,
wherein the third light source is an LED,
wherein the first light receiver is a phototransistor,
wherein the second light receiver is a phototransistor, and
wherein the third light receiver is a phototransistor.

4. The reflectometer according to claim 1, wherein the first reading head further comprises at least one first light-focusing device disposed on the first support,
wherein the second reading head further comprises at least one second light-focusing device disposed on the second support,
wherein the third reading head further comprises at least one third light-focusing device disposed on the third support,
wherein the at least one first light-focusing device comprises at least one of a light piper and a collimator,
wherein the at least one second light-focusing device comprises at least one of a light piper and a collimator, and
wherein the at least one third light-focusing device comprises at least one of a light piper and a collimator.

5. The reflectometer according to claim 1, wherein the microprocessor converts the first analog signal, the second analog signal, and the third analog signal to a first digital signal, a second digital signal, and a third digital signal, respectively, and compares the first digital signal, the second digital signal, and the third digital signal to at least one look-up table to determine the first level of the analyte, the second level of the analyte, and the third level of the analyte based on the first digital signal, the second digital signal, and the third digital signal, respectively.

6. The reflectometer according to claim 1, further comprising a spring clip disposed in the case, wherein the spring clip is configured to hold in place a cassette comprising the test strip,
wherein the case comprises a slot at a first end thereof, the slot being configured to receive said cassette comprising the test strip,
wherein the case comprises a display screen in operable communication with the microprocessor and configured to display the overall level of the analyte,
wherein the case comprises a baffle board mounted within the case and configured to ensure that a distance from the first reading head to the test strip, a distance from the second reading head to the test strip, and a distance from the third reading head to the test strip is consistent across different test strips, and
wherein the baffle board comprises:
a plurality of legs respectively mounted to a plurality of posts within the case;
at least one stopper slot configured to receive at least one stop of a cassette comprising the test strip; and
a plurality of viewing slots configured to align with the first control zone, the test zone, the second control zone, the first reading head, the second reading head, and the third reading head.

7. The reflectometer according to claim 1, the test solution being a biological test solution.

8. The reflectometer according to claim 1, further comprising a temperature sensor in operable communication with the microprocessor and configured to measure a temperature within the case and generate an output signal indicative of a temperature of at least one of the first reading head, the second reading head, and the third reading head, wherein the microprocessor is configured to utilize the output signal to compensate for temperature interference when determining the overall analyte level.

9. The reflectometer according to claim 1, further comprising a background light receiver in operable communication with the microprocessor and configured to receive reflected light from an area of the test strip and generate a reflected light analog signal,
wherein the microprocessor is configured to utilize the reflected light analog signal to compensate for background light when determining the overall analyte level.

10. The reflectometer according to claim 1, wherein the first level of the analyte in the first control zone and the third level of the analyte in the second control zone are utilized to establish an upper standard and a lower standard, respectively, to which the second level of the analyte in the test zone is compared.

11. A kit for measuring an overall level of an analyte in a test solution, the kit comprising:
a lot of test strips;
a cassette configured to receive the test strip; and
the reflectometer according to claim 1,
wherein the lot of test strips of the kit is the lot of test strips for which the reflectometer is calibrated for use.

12. The kit according to claim 11, wherein the cassette comprises:
a well on an upper surface thereof, the well comprising an opening configured to expose the test strip and to accept the test solution so it can reach the test strip;
at least one stop on the upper surface thereof configured to inhibit the cassette from being inserted past a certain, predetermined point within the reflectometer;
a plurality of holes on the upper surface thereof configured to allow air to escape from within the cassette; and
a plurality of viewing slots on an upper surface thereof configured to align with the first control zone, the test zone, the second control zone, the first reading head, the second reading head, and the third reading head, and
wherein the cassette is disposable.

13. The reflectometer according to claim 1, wherein the reflectometer is configured such that the first light source, the second light source, and the third light source all provide light simultaneously with each other.

14. The kit according to claim 11, wherein each test strip of the lot of test strips comprises a red blood cell filter configured to remove red blood cells from whole blood.

15. The reflectometer according to claim 1, wherein the reflectometer is configured such that illumination of the test strip is provided by the first light source, the second light source, and the third light source, and
wherein the reflectometer is free from any light source for illuminating the test strip other than the first light source, the second light source, and the third light source.

16. The kit according to claim 11, wherein the reflectometer is configured such that illumination of the test strip is provided by the first light source, the second light source, and the third light source, and
wherein the reflectometer is free from any light source for illuminating the test strip other than the first light source, the second light source, and the third light source.

17. A reflectometer, comprising:
a case;
a first reading head comprising first scanning optics configured to illuminate a first control zone of a test strip and receive first light from the first control zone;
a second reading head comprising second scanning optics configured to illuminate a text zone of the test strip and receive second light from the test zone;
a third reading head comprising third scanning optics configured to illuminate a second control zone of the test strip and receive third light from the second control zone; and
a microprocessor in operable communication with the first reading head, the second reading head, and the third reading head,
wherein the microprocessor is configured to: receive and analyze a first analog signal, a second analog signal, and a third analog signal corresponding to the first light, the second light, and the third light, respectively; and determine a first level of an analyte in the first control zone based on the first light, a second level of the analyte in the test zone based on the second light, a third level of the analyte in the second control zone based on the third light, and an overall level of the analyte in the test solution based on the first level, the second level, and the third level,
wherein the first reading head comprises a first support disposed in the case, a first light source disposed on the support, and a first light receiver disposed on the support,
wherein the second reading head comprises a second support disposed in the case, a second light source disposed on the support, and a second light receiver disposed on the support,
wherein the third reading head comprises a third support, a third light source disposed on the support, and a third light receiver disposed on the support,
wherein the first light source and the first light receiver are disposed on the first support such that a first angle between a path of light emitted from the first light source and a path of light received by the first light receiver is in a range of 35° to 55°,
wherein the second light source and the second light receiver are disposed on the second support such that a second angle between a path of light emitted from the second light source and a path of light received by the second light receiver is in a range of 35° to 55°,
wherein the third light source and the third light receiver are disposed on the third support such that a third angle between a path of light emitted from the third light source and a path of light received by the third light receiver is in a range of 35° to 55°,
wherein the first light source is a light emitting diode (LED),
wherein the second light source is an LED,
wherein the third light source is an LED,
wherein the first light receiver is a phototransistor,
wherein the second light receiver is a phototransistor,
wherein the third light receiver is a phototransistor,
wherein the first reading head further comprises at least one first light-focusing device disposed on the first support,
wherein the second reading head further comprises at least one second light-focusing device disposed on the second support,
wherein the third reading head further comprises at least one third light-focusing device disposed on the third support,
wherein the at least one first light-focusing device comprises at least one of a light piper and a collimator,
wherein the at least one second light-focusing device comprises at least one of a light piper and a collimator,
wherein the at least one third light-focusing device comprises at least one of a light piper and a collimator,
wherein the microprocessor converts the first analog signal, the second analog signal, and the third analog signal to a first digital signal, a second digital signal, and a third digital signal, respectively, and compares the first digital signal, the second digital signal, and the third digital signal to at least one look-up table to determine the first level of the analyte, the second level of the analyte, and the third level of the analyte based on the first digital signal, the second digital signal, and the third digital signal, respectively,
wherein the case comprises a slot at a first end thereof, the slot being configured to receive a cassette comprising the test strip,
wherein the case comprises a baffle board mounted within the case and configured to ensure that a distance from the first reading head to the test strip, a distance from the second reading head to the test strip, and a distance from the third reading head to the test strip is consistent across different test strips,
wherein the baffle board comprises:
a plurality of legs respectively mounted to a plurality of posts within the case;
at least one stopper slot configured to receive at least one stop of a cassette comprising the test strip; and
a plurality of viewing slots configured to align with the first control zone, the test zone, the second control zone, the first reading head, the second reading head, and the third reading head,
wherein the reflectometer further comprises a spring clip disposed in the case, wherein the spring clip is configured to hold in place a cassette comprising the test strip,
wherein the test solution is a biological test solution,
wherein the case comprises a display screen in operable communication with the microprocessor and configured to display the overall level of the analyte,
wherein the reflectometer further comprises at least one interface connector incorporated in the case and configured to connect to at least one external device,
wherein reflectometer further comprises a temperature sensor in operable communication with the microprocessor and configured to measure a temperature within the case and generate an output signal indicative of a temperature of at least one of the first reading head, the second reading head, and the third reading head,
wherein the microprocessor is configured to utilize the output signal to compensate for temperature interference when determining the overall analyte level,
wherein the reflectometer further comprises a background light receiver in operable communication with the microprocessor and configured to receive reflected light from an area of the test strip and generate a reflected light analog signal,
wherein the microprocessor is configured to utilize the reflected light analog signal to compensate for background light when determining the overall analyte level,
wherein the first level of the analyte in the first control zone and the third level of the analyte in the second control zone are utilized to establish an upper standard and a lower standard, respectively, to which the second level of the analyte in the test zone is compared, wherein the reflectometer is configured such that the first light source, the second light source, and the third light source all provide light at a same wavelength as each other, and wherein the reflectometer is calibrated for use with a specific lot of test strips.

18. The reflectometer according to claim 17, wherein the first angle is about 45°, wherein the second angle is about 45°, and wherein the third angle is about 45°.

19. The reflectometer according to claim 17, wherein the reflectometer is configured such that the first light source, the second light source, and the third light source all provide light simultaneously with each other.

20. The reflectometer according to claim 17, wherein the reflectometer is configured such that illumination of the test strip is provided by the first light source, the second light source, and the third light source, and wherein the reflectometer is free from any light source for illuminating the test strip other than the first light source, the second light source, and the third light source.

* * * * *